(12) United States Patent
Suga

(10) Patent No.: US 12,250,349 B2
(45) Date of Patent: Mar. 11, 2025

(54) METHOD FOR CONTROLLING IMAGE FORMING SYSTEM AND WIRELESS OPERATION UNIT

(71) Applicant: CANON KABUSHIKI KAISHA, Tokyo (JP)

(72) Inventor: Daisuke Suga, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/481,767

(22) Filed: Oct. 5, 2023

(65) Prior Publication Data

US 2024/0040047 A1 Feb. 1, 2024

Related U.S. Application Data

(63) Continuation of application No. 17/571,669, filed on Jan. 10, 2022, now Pat. No. 11,818,308.

(30) Foreign Application Priority Data

Jan. 20, 2021 (JP) ................................. 2021-007087

(51) Int. Cl.
*H04N 1/00* (2006.01)
*G06F 3/12* (2006.01)

(52) U.S. Cl.
CPC ....... *H04N 1/00477* (2013.01); *G06F 3/1204* (2013.01); *G06F 3/1267* (2013.01);
(Continued)

(58) Field of Classification Search
None
See application file for complete search history.

(56) References Cited

U.S. PATENT DOCUMENTS

2006/0274368 A1* 12/2006 Imine ..................... G06K 15/00
358/1.15
2006/0290680 A1 12/2006 Tanaka
(Continued)

FOREIGN PATENT DOCUMENTS

JP 2002366287 A 12/2002
JP 2007320051 A 12/2007
(Continued)

OTHER PUBLICATIONS

Office Action issued in U.S. Appl. No. 17/571,669 mailed on Nov. 21, 2022.
(Continued)

*Primary Examiner* — Frantz Bataille
(74) *Attorney, Agent, or Firm* — ROSSI, KIMMS & McDOWELL LLP

(57) ABSTRACT

A method for controlling an image forming system including a wireless operation unit having a third wireless communication unit, an acquiring unit that acquires status information of the image forming apparatuses, and a display that displays the status information of the image forming apparatuses includes a connection process in which the third wireless communication unit connects individually to each of a first wireless communication unit of a first image forming apparatus and a second wireless communication unit of a second image forming apparatus via wireless communication without a wireless LAN router, an acquisition process in which the acquiring unit acquires the status information of the first image forming apparatus and the status information of the second image forming apparatus individually, and a display process in which the display displays the status information of the first image forming apparatus and the status information of the second image forming apparatus.

15 Claims, 19 Drawing Sheets

(52) U.S. Cl.
CPC ....... *G06F 3/1292* (2013.01); *H04N 1/00244* (2013.01); *H04N 1/00411* (2013.01); *H04N 1/00424* (2013.01)

(56) References Cited

U.S. PATENT DOCUMENTS

| | | | |
|---|---|---|---|
| 2014/0218765 A1* | 8/2014 | Sawayanagi | H04N 1/00111 358/1.15 |
| 2018/0143795 A1 | 5/2018 | Masuzawa | |

FOREIGN PATENT DOCUMENTS

| | | |
|---|---|---|
| JP | 2015087901 A | 5/2015 |
| JP | 2015204563 A | 11/2015 |
| JP | 2019215800 A | 12/2019 |

OTHER PUBLICATIONS

Notice of Allowance issued in U.S. Appl. No. 17/571,669, mailed on Jul. 12, 2023.

* cited by examiner

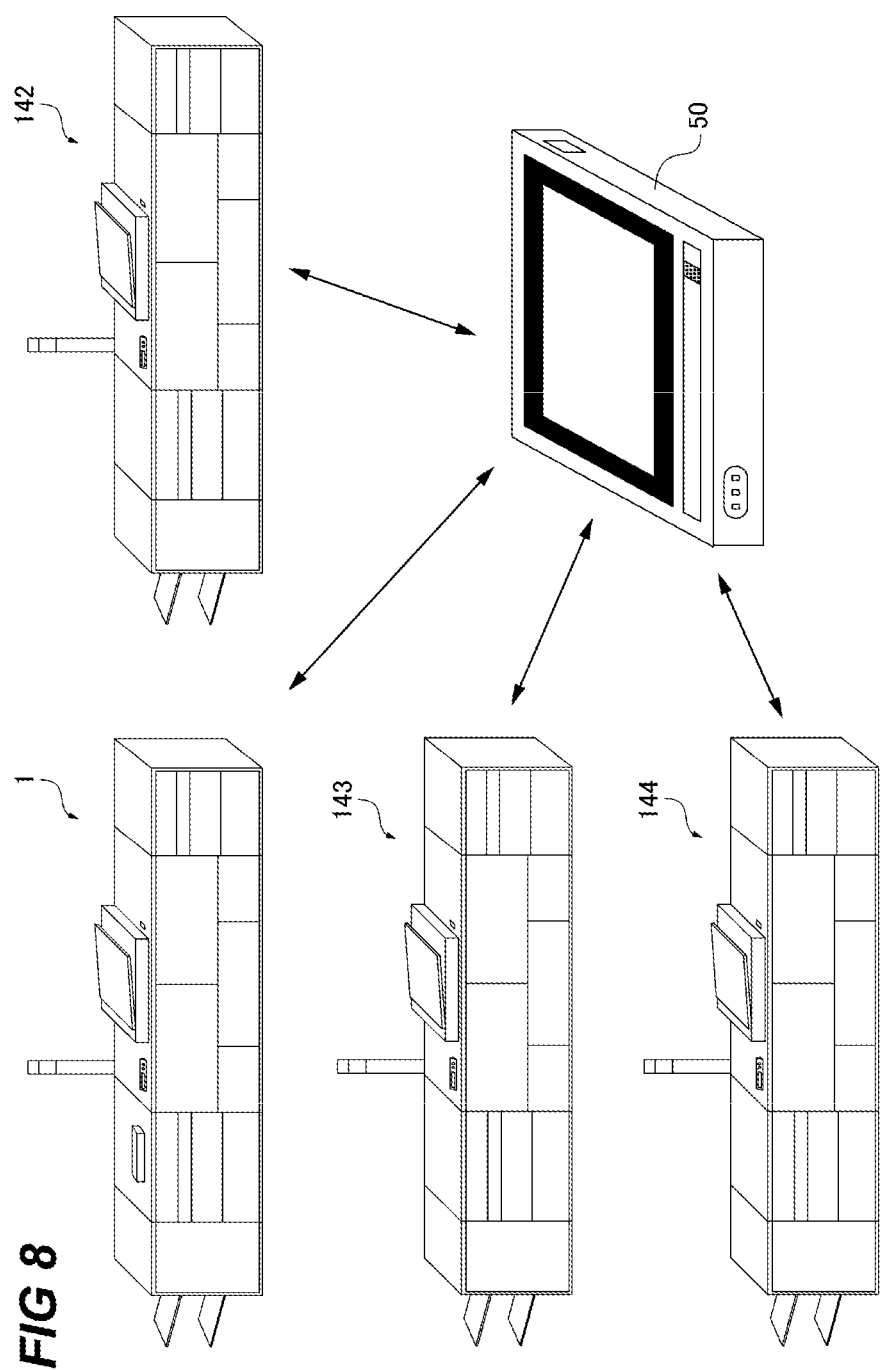

FIG 19

|  | Standby Mode | Sleep Mode |
|---|---|---|
| POWER SUPPLY DEVICE 17 | ○ | ○ |
| CONTROLLER 10 | ○ | ○ |
| NETWORK CONNECTION PORTION 84 | ○ | ○ |
| WIRELESS COMMUNICATION PORTION 81 | ○ | ○ |
| IMAGE FORMING UNIT 15 | ○ | × |
| READER 14 | ○ | × |
| PROCESSING DEVICE 16 | ○ | × |
| DISPLAY PANEL 71 | ○ | × |

METHOD FOR CONTROLLING IMAGE FORMING SYSTEM AND WIRELESS OPERATION UNIT

BACKGROUND OF THE INVENTION

Field of the Invention

The present invention relates to a method for controlling an image forming system including an image forming apparatus such as an electrophotographic copying machine or an electrophotographic printer (for example, a laser beam printer, an LED printer, or the like) and a wireless operation unit that controls the image forming apparatus via wireless communication, and a wireless operation unit.

Description of the Related Art

Conventionally, it is widely known that an image forming apparatus has a display portion for displaying an image and an operation portion for inputting information. In this image forming apparatus, a user can set a setting relating to image formation, such as the size of paper, by operating the operation portion, or can display the status of the image forming apparatus on the display portion.

Further, in Japanese Patent Application Laid-Open No. 2002-366287, an operation display portion in which the above-mentioned display portion and the operation portion are integrated is used as a remote control portion that is detachable from the image forming apparatus, and a configuration including the image forming apparatus and the remote control portion that controls the image forming apparatus via wireless communication is disclosed. In the configuration described in Japanese Patent Application Laid-Open No. 2002-366287, information input by the user from the remote control portion at a position away from the image forming apparatus is transmitted to the image forming apparatus via wireless communication, and the status of the image forming apparatus is displayed on the remote control portion.

However, in the field of commercial printing or the like, one user may operate a plurality of image forming apparatuses. In this case, in the configuration in which the display portion and the operation portion are installed in each image forming apparatus, even when the status of the image forming apparatus is displayed on the display portion, the user needs to check the display portion for each image forming apparatus.

On the other hand, as in the configuration disclosed in Japanese Patent Application Laid-Open No. 2002-366287, even when the status of the image forming apparatus displayed on the remote control portion can be confirmed at a position away from the image forming apparatus, the remote control portion needs to be confirmed for each image forming apparatus.

SUMMARY OF THE INVENTION

A method for controlling an image forming system including
a first image forming apparatus that has a first wireless communication unit configured to perform wireless communication and that is configured to form an image on a sheet based on image data,
a second image forming apparatus that has a second wireless communication unit configured to perform wireless communication and that is configured to form an image on a sheet based on image data, and
a wireless operation unit having a third wireless communication unit capable of wirelessly communicating with the first wireless communication unit and the second wireless communication unit, an acquiring unit configured to acquire, via wireless communication, status information, which is information on a status of the first image forming apparatus and a status of the second image forming apparatus, and a display configured to display the status information acquired by the acquiring unit, the method including:
a connection process in which the third wireless communication unit connects individually to each of the first wireless communication unit and the second wireless communication unit via wireless communication without a wireless LAN router;
a first acquisition process in which the acquiring unit acquires the status information of the first image forming apparatus in a state in which the third wireless communication unit and the first wireless communication unit are connected to each other via wireless communication;
a second acquisition process in which the acquiring unit acquires the status information of the second image forming apparatus in a state in which the third wireless communication unit and the second wireless communication unit are connected to each other via wireless communication; and
a display process in which the display displays, side by side on a screen, the status information of the first image forming apparatus acquired in the first acquisition process and the status information of the second image forming apparatus acquired in the second acquisition process.

Further features of the present invention will become apparent from the following description of exemplary embodiments with reference to the attached drawings.

BRIEF DESCRIPTION OF THE DRAWINGS

FIG. 8 is a diagram illustrating an example of an image displayed on the display of the remote control panel;

FIG. 19 is a table diagram illustrating operation modes of the image forming apparatus.

DESCRIPTION OF THE EMBODIMENTS

Hereinafter, embodiments of the present invention will be exemplified in detail with reference to the drawings. However, dimensions, materials, shapes, relative arrangements, and the like of components described in the following embodiments should be appropriately changed depending on the configuration of an apparatus to which the present invention is applied and various conditions. It is not intended to limit the scope of the invention to those only.

First Embodiment

Figure 1:
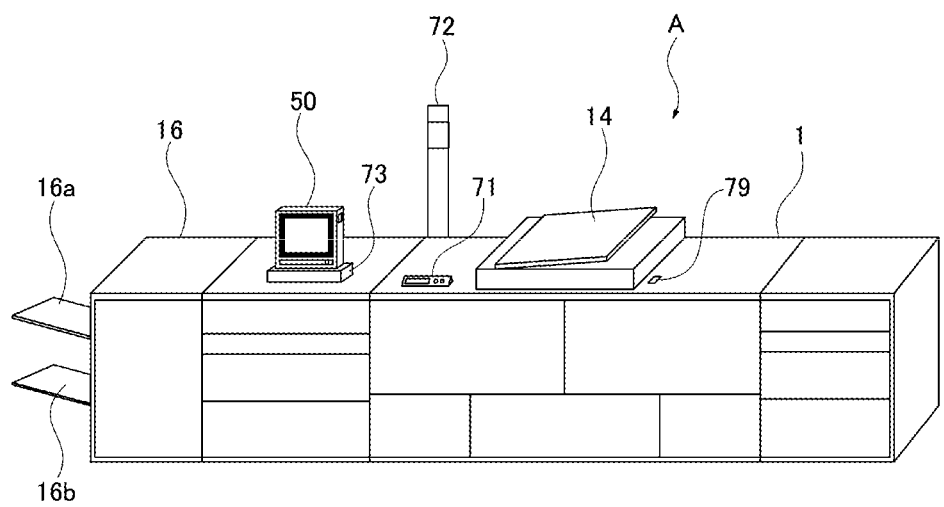
FIG. 1 is a schematic perspective view of an image forming system.
Figure 2:
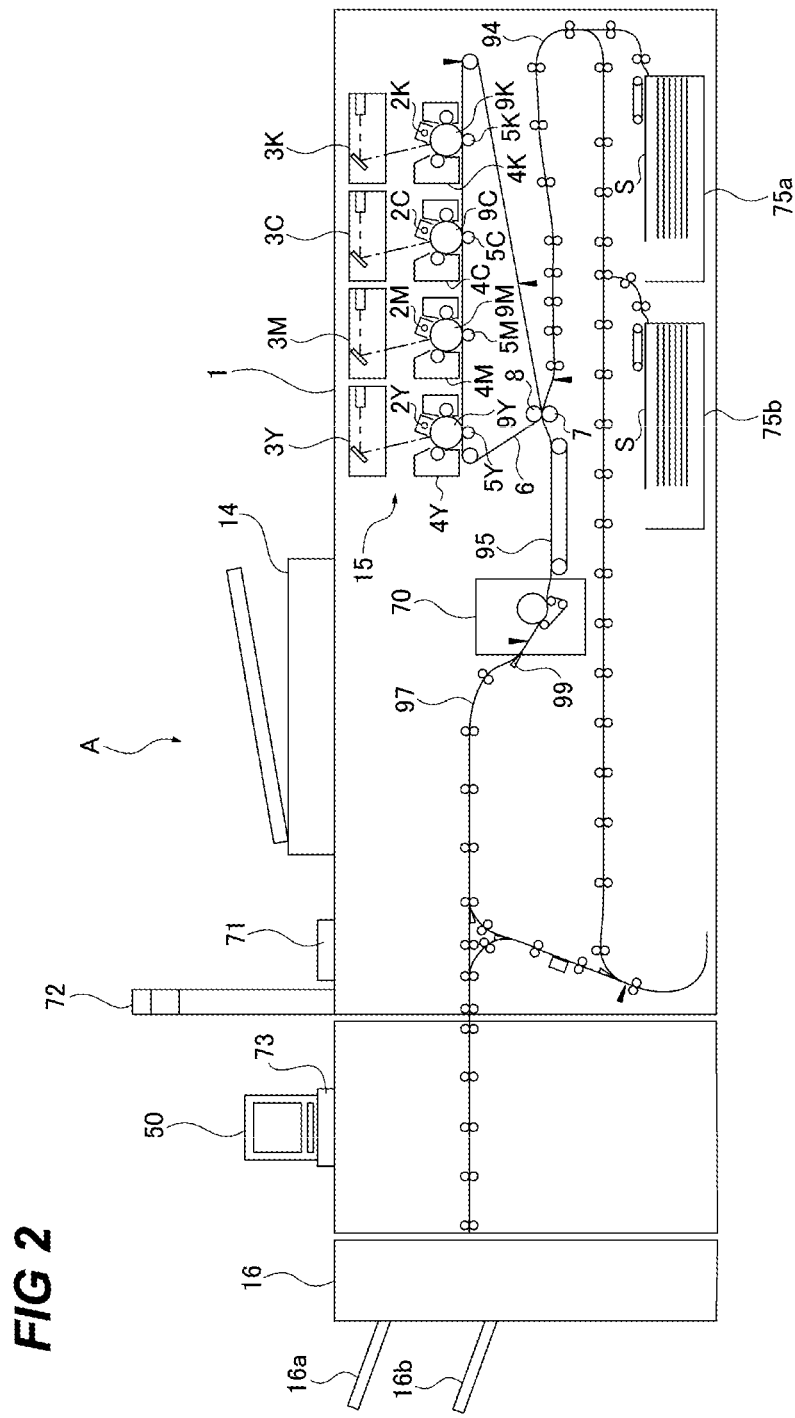
FIG. 2 is a schematic cross-sectional view of the image forming system.
Figure 3A:
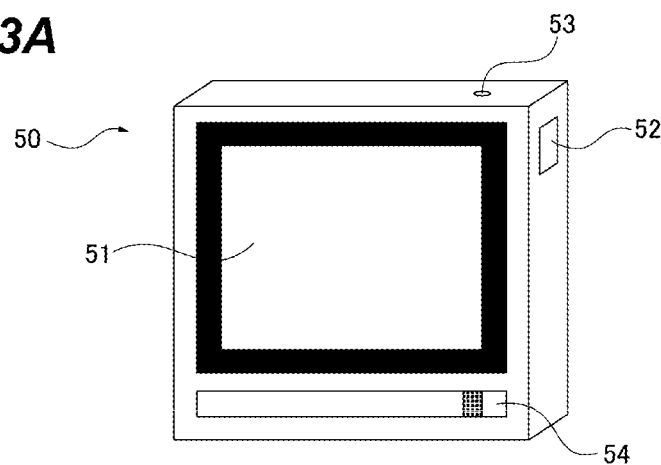
FIGS. 3A, 3B, and 3C are schematic perspective views of a remote control panel.
Figure 3B:
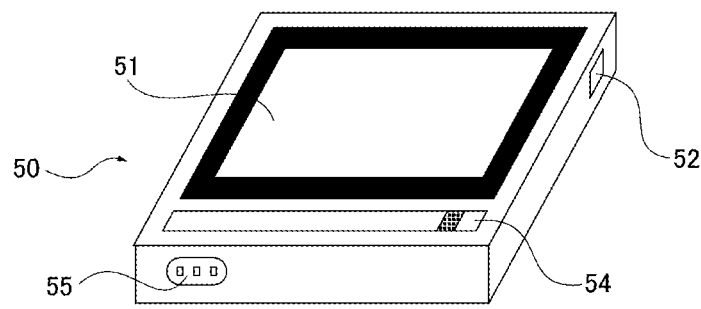
Figure 3C:
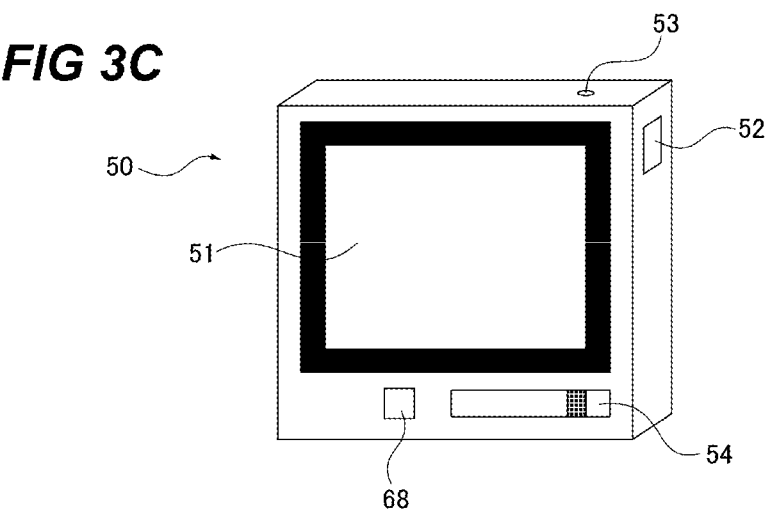

An image forming system according to the first embodiment will be described with reference to FIGS. 1 to 3C. FIG. 1 is a schematic perspective view of the image forming system. FIG. 2 is a schematic cross-sectional view of the image forming system. FIGS. 3A to 3C are schematic perspective views of a remote control panel.

<Image Forming System>

As illustrated in FIGS. 1 and 2, the image forming system A includes an image forming apparatus 1 that forms an image on a sheet S, and the remote control panel 50 (wireless operation unit) that controls the image forming apparatus 1.

<Image Forming Apparatus>

As illustrated in FIG. 1, an upper portion of the image forming apparatus 1 is provided with a reader 14 that optically reads an image of an original placed on a glass surface (not illustrated) and converts the image into image data. Further, the image forming apparatus 1 is provided with a processing device 16 that performs processes such as a stapling process, a punching process, and a bookbinding process on the sheet S on which the image is formed. The processing device 16 is an example of an optional device connected to the image forming apparatus 1. In addition to the processing device 16 provided as an example of the present embodiment, as an optional device, a cooling device may be used, which cools the sheet S on which the image is formed. That is, the optional devices referred to here refer to all devices that can be retrofitted to the image forming apparatus 1.

Further, the image forming apparatus 1 includes a seesaw type or tactile type main power switch 79 that switches a main power supply on and off. Further, the image forming apparatus 1 includes a display panel 71 that displays a lamp or an error code to notify a user of the status of the image forming apparatus 1, such as the image forming process being performed, stopped due to an error, or in the standby state. Further, the image forming apparatus 1 includes a tower type lamp 72 that notifies the user at a distant position of the status of the image forming apparatus 1 by turning on and off and blinking a light source.

Further, the image forming apparatus 1 includes a panel mounting portion 73 to which the remote control panel 50 (wireless operation unit) is detachably attachable. The remote control panel 50 will be described later.

As illustrated in FIG. 2, the image forming apparatus 1 includes an image forming unit 15 that forms an image on the sheet S based on input image data. The image forming unit 15 includes a photosensitive drum 9Y, 9M, 9C, 9K, a charging device 2Y, 2M, 2C, 2K, and a developing device 4Y, 4M, 4C, 4K. The image forming unit 15 includes a primary transfer roller 5Y, 5M, 5C, 5K, a laser scanner unit 3Y, 3M, 3C, 3K, an intermediate transfer belt 6, a secondary transfer roller 7, and a secondary transfer counter roller 8.

Figure 4:
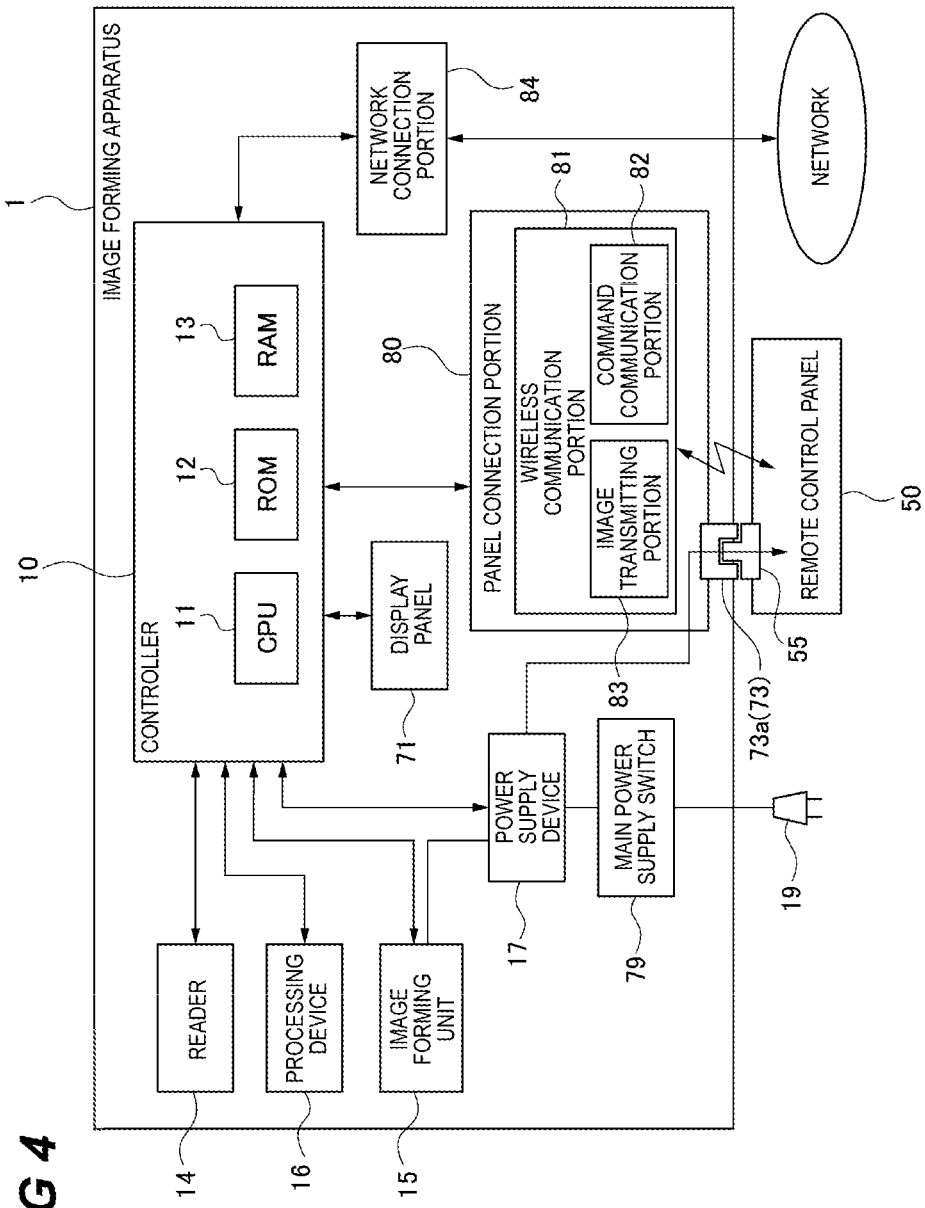
FIG. 4 is a block diagram illustrating a system configuration of an image forming apparatus.

In the case where an image is formed by the image forming apparatus 1, an image forming job is first input to a controller 10 (see FIG. 4). As a result, the sheet S stored in either a sheet cassette 75*a* or 75*b* is conveyed to a transport path 94. After that, the sheet S passes through the transport path 94 and is conveyed to a secondary transfer portion formed by the secondary transfer roller 7 and the secondary transfer counter roller 8.

On the other hand, in the image forming unit 15, first, the surface of the photosensitive drum 9Y is charged by the charging device 2Y. After that, the laser scanner unit 3Y irradiates the surface of the photosensitive drum 9Y with laser light according to the image data of the original read by the reader 14 or the image data transmitted from an external device (not illustrated) via a network, and an electrostatic latent image is formed on the surface of the photosensitive drum 9Y. The image data sent from the external device is sent to a network connection portion 84, which will be described later, via a wireless LAN router.

Thereafter, yellow toner is caused to adhere to the electrostatic latent image formed on the surface of the photosensitive drum 9Y by the developing device 4Y to form a yellow toner image on the surface of the photosensitive drum 9Y. The toner image formed on the surface of the photosensitive drum 9Y is primarily transferred to the intermediate transfer belt 6 by applying a primary transfer bias to the primary transfer roller 5Y.

By a similar process, magenta, cyan, and black toner images are also formed on the photosensitive drums 9M, 9C, and 9K. By applying the primary transfer bias to the primary transfer rollers 5M, 5C, and 5K, these toner images are transferred and superimposed on the yellow toner image on the intermediate transfer belt 6. As a result, a full-color toner image is formed on the surface of the intermediate transfer belt 6.

After that, the intermediate transfer belt 6 moves around to convey the full-color toner image to the secondary transfer portion. In the secondary transfer portion, a secondary transfer bias is applied to the secondary transfer roller 7, whereby the full-color toner image on the intermediate transfer belt 6 is transferred to the sheet S. The sheet S to which the toner image is transferred is conveyed to a fixing device 70 by a conveying belt 95. Then, the fixing device 70 heats and pressurizes the toner image to fix the toner image onto the sheet S.

Next, the sheet S on which the toner image is fixed is conveyed to the processing device 16 through a discharge path 97. When the user specifies a process such as the stapling process, the punching process, or the bookbinding process, the sheet S conveyed to the processing device 16 is discharged to a discharge tray 16a after the specified process is performed. If the user does not specify the process, the sheet S conveyed to the processing device 16 is discharged to a discharge tray 16b without being processed as it is.

<Wireless Operation Unit>

As illustrated in FIGS. 1 and 3C, the remote control panel 50 (remote control portion) is detachably attachable to the panel mounting portion 73 of the image forming apparatus 1. The remote control panel 50 is configured to wirelessly communicate information with the image forming apparatus 1. Since the remote control panel 50 is not connected via a cable (wired connection), the user can freely carry it around and can control the image forming apparatus 1 at a position away from the image forming apparatus 1. In this case, the remote control panel 50 according to the present embodiment is an operation unit that issues an instruction to perform image formation to the image forming apparatus 1. That is, the image data of the original is not sent from the remote control panel 50 to the image forming apparatus 1. The image data is sent from an external terminal to the image forming apparatus 1 via the wireless LAN router, or is generated in the image forming apparatus 1 by reading the original by the reader 14. In this way, the external terminal and the image forming apparatus 1 are connected to each other via the wireless LAN router, whereas the remote control panel 50 is connected to the image forming apparatus 1 without a wireless LAN router. When the remote control panel 50 is mounted on the panel mounting portion 73, a charging connector 55 (see FIG. 3B) of the remote control panel 50 is connected to a power supply connector 73a (see FIG. 5) of the panel mounting portion 73. As a result, the image forming apparatus 1 detects the connection of the remote control panel 50, and the image forming apparatus 1 charges a battery 57 (see FIG. 5) of the remote control panel 50.

Although the configuration in which the remote control panel 50 (remote control portion) is detachably attachable to the image forming apparatus 1 is exemplified, the remote control panel 50 (remote control portion) may not be detachably attachable to the image forming apparatus 1 and may be separate from the image forming apparatus 1 and configured to control the image forming apparatus 1 via wireless communication.

As illustrated in FIGS. 3A and 3B, the remote control panel 50 includes a power switch 52 for switching a power supply of the remote control panel 50 on and off, and a speaker portion 53 for outputting a sound. Further, the remote control panel 50 has a status display portion 54 that is turned on and off and blink to notify the user of the status of the remote control panel 50 In this case, the status display portion 54 includes an LED, but is not limited to this configuration.

Further, the remote control panel 50 has a touch panel type display 51 (display portion) in which a display portion capable of displaying information based on image data and an operation portion for detecting a touch operation from a user are integrated. By touching a key displayed on the display 51 with a finger to perform inputting, the user can set a setting relating to image formation, such as a setting for the number of sheets on which an image is to be formed and a setting for the size of the sheet S, and can set a setting relating to image reading, such as a setting for the size of the original. Further, the remote control panel 50 has a collective status display button 66 (acquisition icon, see FIG. 7A) for instructing to acquire statuses of a plurality of image forming apparatuses including the image forming apparatus 1. The collective status display button 66 is displayed on the display 51. The user touches the collective status display button 66 (see FIG. 7A) displayed on the display 51 with a finger to collectively display the statuses of the plurality of image forming apparatuses wirelessly connected to the remote control panel 50. The collective status display by the remote control panel 50 will be described in detail later.

Further, in the present embodiment, as an operation display portion included in the remote control panel 50, the touch panel type display 51 in which the display portion and the operation portion are integrated is exemplified. That is, the configuration in which the touch panel type display 51 is mounted on the remote control panel 50 is exemplified. However, the present invention is not limited thereto. For example, the remote control panel 50 may have a configuration in which a hardware key such as a numeric keypad or a reset key is provided as a key operation input portion separately from the display 51 (operation display portion) described above.

Further, the remote control panel 50 may have a configuration in which a collective status display key 68 (input portion, hardware key, or key operation input portion) is independently provided on the display 51 described above in addition to the collective status display button 66 (FIG. 3C). Further, the remote control panel 50 can be provided with the independent collective status display key 68 (input portion, hardware key, key operation input portion) without displaying the collective status display button on the display 51 (see FIG. 7B).

<System Configuration of Image Forming Apparatus>

Next, a system configuration of the image forming apparatus 1 will be described with reference to FIG. 4. FIG. 4 is a block diagram illustrating the system configuration of the image forming apparatus 1.

As illustrated in FIG. 4, the image forming apparatus 1 includes a controller 10 having a CPU 11, a ROM 12, and a RAM 13. The reader 14, the image forming unit the processing device 16, the display panel 71, and the like are connected to the controller 10. Further, the controller 10 is connected to the network connection portion 84 that connects to the external device (not illustrated) via the network.

The ROM 12 (storage portion) stores various programs and various image data relating to the control of the image forming apparatus 1. The CPU 11 performs various arithmetic processing based on a control program stored in the ROM 12. The RAM13 temporarily stores data. That is, the CPU 11 controls the reader 14, the image forming unit 15, the processing device 16, and the like connected to the controller 10 to perform the above-mentioned image forming operation while using the RAM 13 as a work area based on the control program stored in the ROM 12.

Although the configuration in which the controller 10 has the ROM 12 as the storage portion is exemplified, the present invention is not limited thereto, and the controller 10 may have storage separate from the ROM 12 as the storage portion. The storage is, for example, an HDD or an SSD, and is used for storing various data. The data stored in the storage is, for example, an image to be displayed on the remote control panel 50, print data, or the like.

The network connection portion 84 is used to receive a print instruction and print data for the image forming apparatus via the network. The network connection portion 84 is also used to receive user instructions to change a setting of the image forming apparatus and turn off the power supply from a remote location via the network by using the remote control panel 50, a PC, or a tablet. In this case, the network to which the network connection portion 84 is connected may be wired connection or wireless connection.

Further, the controller 10 is connected to a panel connection portion 80 that connects to the remote control panel 50. The panel connection portion 80 has a wireless communication portion 81 (first wireless communication unit, second wireless communication unit) that performs wireless communication between the panel mounting portion 73, which has the power supply connector 73a and to which the remote control panel 50 is connected, and the remote control panel 50. The charging connector 55 of the remote control panel 50 is connected to the power supply connector 73a of the panel mounting portion 73.

The wireless communication portion 81 includes a command communication portion 82 and an image transmitting portion 83. The CPU 11 reads an image stored in the ROM 12 (or storage) and transmits the image to the remote control panel 50 via the image transmitting portion 83 of the wireless communication portion 81. Further, the CPU 11 generates an instruction for the remote control panel 50 and transmits the instruction to the remote control panel 50 via the command communication portion 82. Further, the CPU 11 receives a notification generated by the remote control panel 50 and an instruction generated by the remote control panel 50 via the command communication portion 82. In the present embodiment, the command communication portion 82 and the image transmitting portion 83 are configured separately, but may be combined into one communication line.

The network connection portion 84 and the wireless communication portion 81 may be shared, but in that case, the Wi-Fi direct method, which is a communication mode for directly connecting the image forming apparatus and the remote control panel, cannot be used. Furthermore, the connection will be via a normal network (via an access point), and print data, command communication and screen data will be communicated via the same route. Therefore, since the amount of communication data increases, the response of the screen display on the remote control panel may become slow, and it may take time to receive the print data of the image forming apparatus. Therefore, in the present embodiment, the network connection portion 84 and the wireless communication portion 81 are configured separately.

A power supply device 17 is connected to the controller 10. The power supply device 17 receives power from a commercial power supply via an outlet plug 19, converts the power into electric power to be used by each device, and supplies the electric power to each device. Specifically, first, the power supply device 17 supplies power to the controller 10 when the main power switch 79 is switched from off to on. After that, the power supply device 17 supplies, based on an instruction of the controller power to the reader 14, the image forming unit 15, the processing device 16, the display panel 71, the remote control panel 50 mounted on the panel mounting portion 73, the wireless communication portion 81, the network connection portion 84, and the like. In this case, a line connecting the power supply device 17 and the controller 10 illustrated in FIG. 4 is a signal line. Through this signal line, the controller 10 instructs the power supply device 17 which unit to supply power to. Further, in FIG. 4, a line connecting the power supply device 17 to the image forming unit 15 is a power supply line, and power is supplied from the power supply device 17 to the image forming unit through this power supply line. Power supply lines are connected to units such as the reader 14, the processing device 16, and the display panel 71 from the power supply device 17, but are not illustrated in FIG. 4.

The power supply line extending from the power supply device 17 to the image forming unit 15 is connected to a drive source of the image forming unit 15. That is, a "state in which power is supplied from the power supply device 17 to the image forming unit 15" means that power is supplied to the drive source of the image forming unit 15, for example, a motor for rotating the photosensitive drum 9, a motor for rotating a charging roller of the charging device 2, a motor for rotating a developing roller of the developing device 4, a motor for rotating the primary transfer roller 5, a motor for rotating the intermediate transfer belt 6, a motor for rotating the secondary transfer roller 7, and the like. In a standby mode described later, power is supplied from the power supply device 17 to these drive sources. On the other hand, in a sleep mode described later, power is not supplied from the power supply device 17 to these drive sources.

Further, when the main power switch 79 is turned off, the power supply device 17 stops the supply of power based on an instruction of the controller 10 (CPU 11). Further, even when the main power switch 79 is not turned off, the power supply device 17 can turn off the main power switch 79 by stopping the supply of power based on an instruction from the controller 10 (CPU 11). The case where the main power switch 79 is turned off based on the instruction from the controller 10 (CPU 11) is, for example, when an abnormality occurs or when a power off instruction is received from the user via the network connection portion 84.

The image forming apparatus 1 can shift to a normal mode and a power saving mode that consumes less power than the normal mode, and the controller 10 (CPU 11) performs control to reduce the power consumption. Specifically, when the user selects image reading, power is supplied to the reader 14, but power is not supplied to the image forming unit 15 and the processing device 16. When the image forming apparatus is not used, unnecessary power supply is stopped even in the controller 10. The case where the image forming apparatus is not used means, for example, the case where the image forming apparatus is not used for a certain period of time or the case where the image forming apparatus receives, from the user via the remote control panel 50, an instruction to shift to the power saving mode. Then, when the mode shifts to the power saving mode, power is supplied only to user-input portions such as the network connection portion 84 and the panel connection portion 80. In order to reduce the power consumption, the supply of power to the panel connection portion 80 may be stopped to limit user input to input from the network connection portion 84. In that case, it is necessary to change the control such that the network connection portion 84 and the remote control panel 50 communicate with each other. When input from the user is detected in the power saving mode, the image forming apparatus 1 is returned from the power saving mode to the normal mode via the controller 10 (CPU 11).

<Various Power Modes of Image Forming Apparatus>

FIG. 19 is a table diagram summarizing the types of components to which the power supply device 17 supplies power in the image forming apparatus 1 for each of the modes. The power modes of the image forming apparatus will be described below with reference to FIG. 19.

When the power mode of the image forming apparatus is the "normal mode", the status of the image forming apparatus described later is "standby". Further, when the power mode of the image forming apparatus is the "power saving mode", the status of the image forming apparatus described later is "sleep".

<Normal Mode (Standby Mode)>

When the image forming apparatus is in the normal mode, the power supply device 17 supplies power to the controller 10. After that, the power supply device 17 supplies power to, for example, the drive source of the image forming unit 15 based on an instruction of the controller 10. When the remote control panel 50 is mounted on the panel mounting portion 73, the power supply device 17 supplies power to the remote control panel 50 mounted on the panel mounting portion 73.

<Power saving Mode (Sleep Mode)>

On the other hand, when the image forming apparatus shifts from the normal mode to the power saving mode, the power supply device 17 supplies power to the wireless communication portion 81 and the network connection portion 84 based on an instruction of the controller 10. However, the power supply device 17 stops, based on an instruction of the controller 10, supplying power to the drive source of the image forming unit 15 to which power was supplied in the normal mode. When the remote control panel 50 is mounted on the panel mounting portion 73, the power supply device 17 supplies power to the remote control panel 50 mounted on the panel mounting portion 73. That is, in the power saving mode, the power supply device 17 does not supply power to the drive source of the image forming unit 15, while in the normal mode, the power supply device 17 supplies power to the drive source of the image forming unit 15.

<System Configuration of Remote Control Panel>

Figure 5:
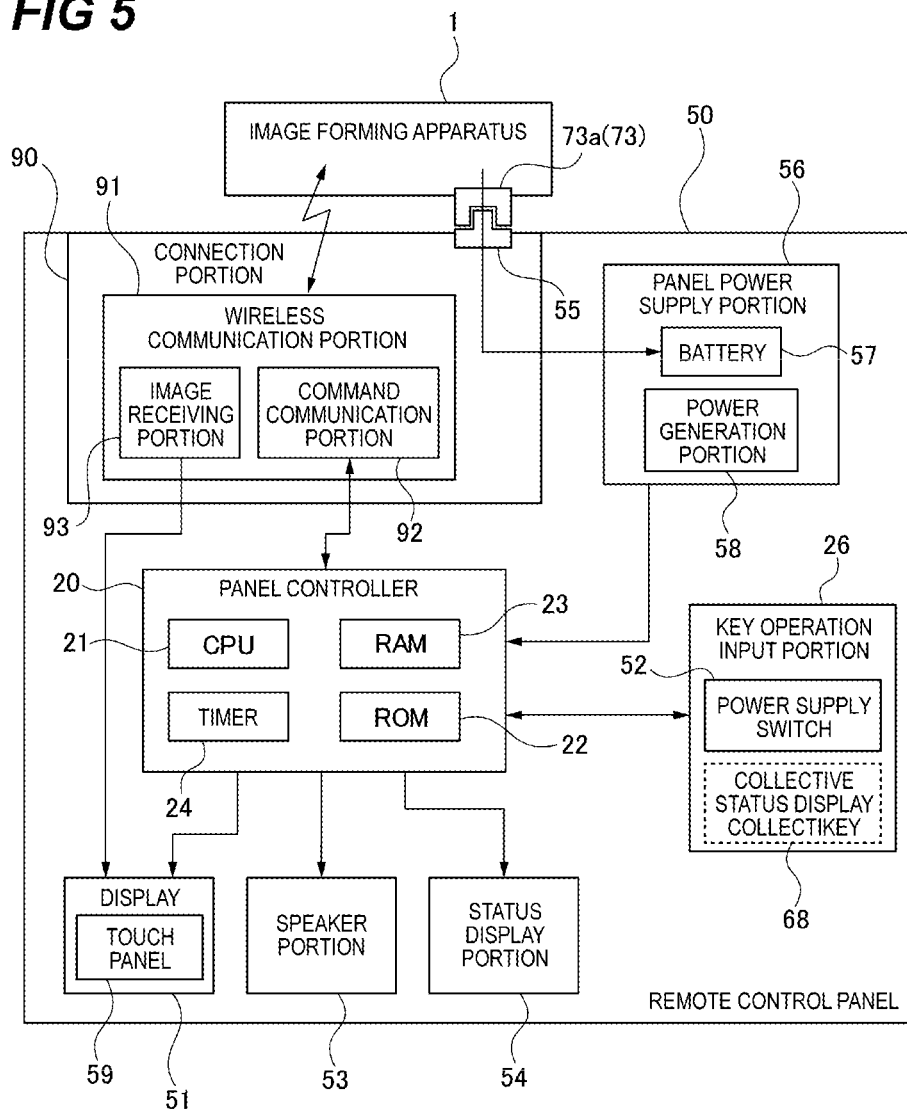
FIG. 5 is a block diagram illustrating a system configuration of the remote control panel.

Next, the system configuration of the remote control panel 50 will be described with reference to FIG. 5. FIG. 5 is a block diagram illustrating the system configuration of the remote control panel 50.

As illustrated in FIG. 5, the remote control panel 50 includes a panel controller 20 having a CPU 21 (controller), a ROM 22, a RAM 23, and a timer 24. The timer 24 clocks when the panel controller 20 performs various processes.

The ROM 22 (storage portion) stores data such as various programs relating to the control of the remote control panel 50. The CPU 21 performs various arithmetic processing based on a control program stored in the ROM 22. RAM23 temporarily stores data. That is, the CPU 21 (controller) controls the display 51, the speaker portion 53, the status display portion 54, and the like connected to the panel controller 20 while using the RAM 23 as a work area based on the control program stored in the ROM 22.

The ROM 22 can also store an SSID (identification information) and a password that are used to connect the remote control panel 50 to each image forming apparatus via wireless communication. For example, before the remote control panel 50 and the image forming apparatus are connected to each other via wireless communication for the first time, the user operates the remote control panel 50 and stores the SSID and the password in the ROM 22 in advance. Alternatively, the ROM 22 may automatically store the aforementioned information at the first wireless connection. The memory 22 stores, for example, a password (first password) required for wirelessly connecting the remote control panel 50 to a first image forming apparatus and an SSID (first identification information) of the first image forming apparatus in association with each other. Similarly, the memory 22 stores, for example, a password (second password) required for wirelessly connecting the remote control panel 50 to a second image forming apparatus and an SSID (second identification information) of the second image forming apparatus in association with each other.

Further, the remote control panel 50 includes a connection portion 90 for connecting to the image forming apparatus 1. The connection portion 90 includes a charging connector 55 connected to the power supply connector 73a of the image forming apparatus 1 and a wireless communication portion 91 (third wireless communication unit) that performs wireless communication with the image forming apparatus 1. The remote control panel 50 in the present embodiment can perform wireless communication with a plurality of image forming apparatuses. For example, an image forming system is assumed, which includes a certain image forming apparatus (first image forming apparatus), another image forming apparatus (second image forming apparatus), and the remote control panel 50. In this image forming system, the wireless communication portion 91 (third wireless communication unit) of the remote control panel 50 performs wireless communication individually with each of a first wireless communication unit of the first image forming apparatus and a second wireless communication unit of the second image forming apparatus. Specifically, direct communication is performed in order using the Wi-Fi direct communication method. However, the direct communication referred to here refers to wireless communication performed without a wireless LAN router, and is not limited to the Wi-Fi direct communication method.

The wireless communication portion 91 has a command communication portion 92 connected to the CPU 21 and an image receiving portion 93 connected to the display 51. The CPU 21 generates an instruction and a notification for the image forming apparatus 1 and transmits the instruction and the notification to the command communication portion 82 of the image forming apparatus 1 via an antenna (not illustrated) of the command communication portion 92. Further, the CPU 21 receives an instruction and information transmitted from the command communication portion 82 of the image forming apparatus 1 via the command communication portion 92.

The image receiving portion 93 receives image data transmitted from the image transmitting portion 83 of the image forming apparatus 1 via the antenna (not illustrated), converts the image data into image data to be displayed on the display 51, and displays the image data on the display 51. In the present embodiment, the command communication portion 92 and the image receiving portion 93 have been described as portions separate from each other, but may be combined into one communication line.

Further, the wireless communication portion 91 performs wireless communication via the wireless communication portion 81 of the image forming apparatus 1 by Wi-Fi direct communication, which is a communication mode for directly connecting the image forming apparatus to the remote control panel. Miracast, which is a display transmission technology that applies this Wi-Fi direct communication method, is used in, for example, mobile phones, displays, projectors, and the like. The communication mode for directly connecting the image forming apparatus 1 to the remote control panel 50 may be a mode in which wireless communication is performed by another method such as Bluetooth or NFC instead of wireless communication by Wi-Fi. Further, the wireless communication portion 91 performs wireless communication via the network connection portion 84 of the image forming apparatus that can be connected via an access point (for example, a Wi-Fi router) in a communication mode that connects the image forming apparatus to the remote control panel 50. Based on an instruction of the CPU 21, the wireless communication portion 91 switches between a communication mode in which the image forming apparatus and the remote control panel are connected directly to each other and a communication mode in which the image forming apparatus and the remote control panel are connected to each other via the access point, and performs wireless communication with the image forming apparatus.

The display 51 is a display portion capable of displaying information based on image data received from the image forming apparatus via the wireless communication portion 91. Therefore, the display 51 outputs an image received from the image forming apparatus via the wireless communication portion 91.

Further, as described above, the display 51 is a touch panel type display (operation display portion) in which the display portion and the touch panel 59, which is an operation portion for detecting a touch operation from the user, are integrated. The display 51 is arranged such that the touch panel 59 overlaps the display 51, and the user operates the display 51 by touching the display 51 via the touch panel 59 with a finger.

Figure 6A:
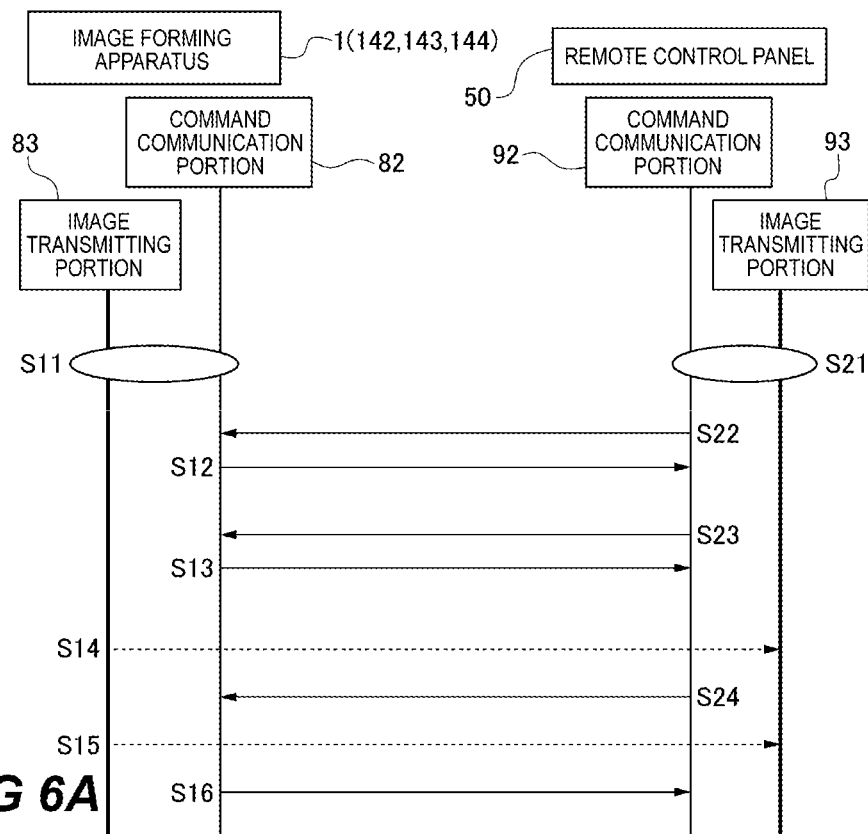
FIG. 6A is a diagram illustrating communication transition between the image forming apparatus and the remote control panel.
Figure 6B:
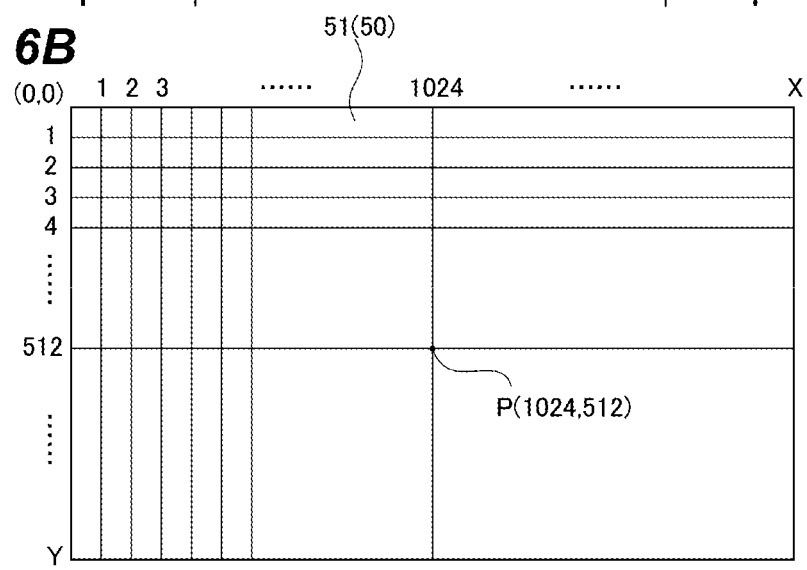
FIG. 6B is a diagram in which coordinates are displayed on a touch panel of the remote control panel.

In this case, when the user operates the touch panel 59, the CPU 21 of the remote control panel 50 transmits information of the operation of the touch panel 59 to the image forming apparatus 1 as coordinate information. This will be described below. FIG. 6B is a diagram in which coordinates are displayed on the touch panel 59 of the remote control panel 50. As illustrated in FIG. 6B, the touch panel 59 is divided in an X direction and a Y direction. Although the number of divided sections depends on the touch panel method or the like, the resistance type touch panel of the present embodiment is divided into 2048 sections in the X direction and 1024 sections in the Y direction.

Figure 7A:
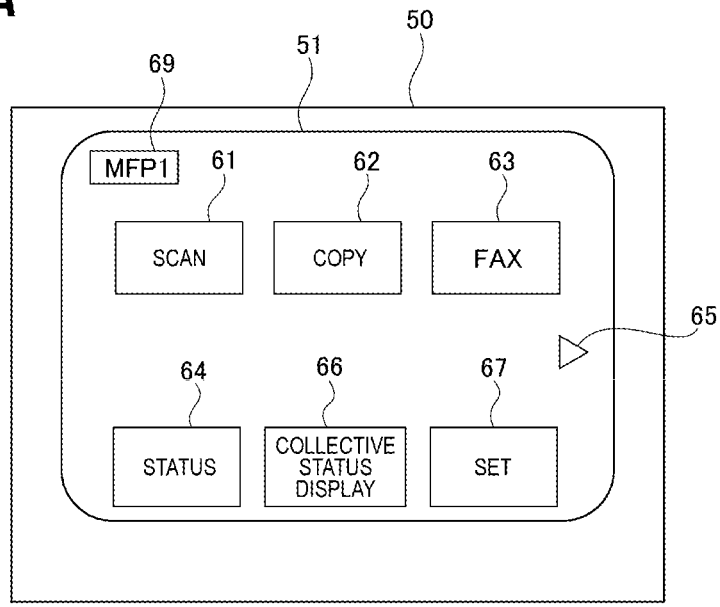
FIGS. 7A and 7B are diagrams illustrating examples of an image displayed on a display of the remote control panel.
Figure 7B:
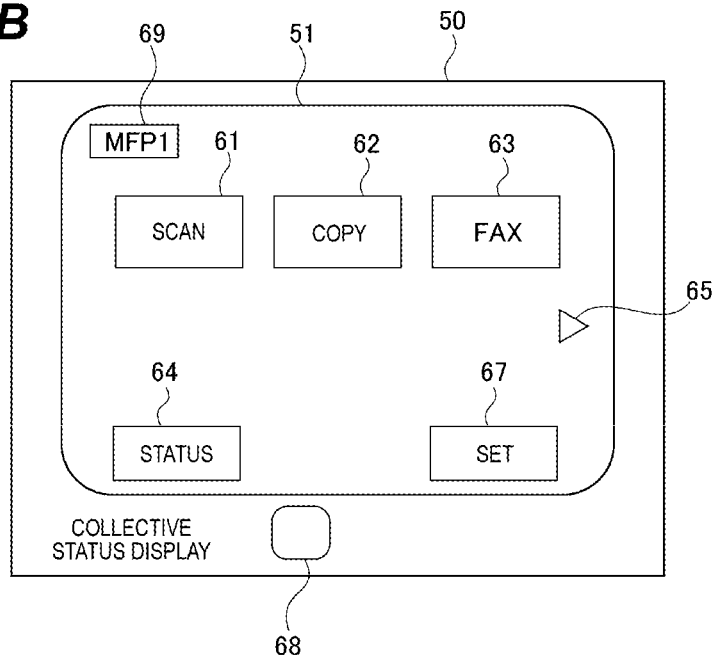

Coordinates are represented by (X, Y) according to the distance from the origin with reference to the origin (0, 0). For example, a position P illustrated in FIG. 7B is expressed as coordinates (1024, 512) since the position P is 1024 away from the origin in the X direction and 512 away from the origin in the Y direction. The coordinate data is transmitted from the touch panel 59 (see FIG. 5) to the CPU 21 of the remote control panel 50, and is transmitted from the command communication portion 92 to the image forming apparatus 1 according to an instruction of the CPU 21. In the present embodiment, data that is communicated between the image forming apparatus 1 and the remote control panel 50 has an 8-bit length, and the numerical values of the coordinate data are converted into 1/8 of the values and transmitted. That is, when the coordinates are (1024, 512), the coordinates are converted into (128, 64) and transmitted.

Further, the remote control panel 50 includes a panel power supply portion 56. The panel power supply portion 56 includes a battery 57 and a power generation portion 58. The battery 57 is a main power supply of the remote control panel 50 and is a rechargeable battery. When the charging connector 55 is connected to the power supply connector 73a of the image forming apparatus 1, power is supplied from the power supply device 17 of the image forming apparatus 1 to the battery 57, and the battery 57 is charged. Further, the power generation portion 58 adjusts the power of the battery 57 to a voltage that can be used by each device included in the remote control panel 50. When the power supply of the power switch 52 is switched from off to on, the power adjusted by the power generation portion 58 is supplied to the panel controller 20, the display 51, the speaker portion 53, the status display portion 54, and the connection portion 90.

Further, the remote control panel 50 includes a key operation input portion 26 in addition to the touch panel type display 51. The key operation input portion 26 is a hardware key provided in an area other than the display 51 of the remote control panel 50. The key operation input portion 26 has the power switch 52 that switches the power of the remote control panel 50 on and off as a hardware key. Further, the key operation input portion 26 may be provided with a collective status display key 68 (input portion) as a hardware key for inputting to acquire statuses of a plurality of image forming apparatuses wirelessly connected to the remote control panel 50. In the present embodiment, a configuration in which the collective status display button 66 (see FIG. 7A) is displayed on the display 51 is exemplified. Therefore, in addition to the configuration in which the collective status display button 66 (see FIG. 7A) is displayed on the display 51, the collective status display key 68 may be separately provided independently. Alternatively, the remote control panel 50 may be provided with the collective status display key 68, which is a hardware key, without displaying a collective status display key on the display 51 (see FIG. 7B). The operation of the collective status display key 68 and the collective status display button 66 will be described later with reference to FIG. 9.

<Wireless Communication Between Image Forming Apparatus and Remote Control Panel>

Next, the wireless communication between the image forming apparatus 1 and the remote control panel 50 will be described with reference to FIG. 6A. FIG. 6A is a diagram illustrating communication transition between the image forming apparatus 1 and the remote control panel 50.

To perform wireless communication between the image forming apparatus 1 and the remote control panel 50, the user first operates the main power switch 79 to activate the image forming apparatus 1 (S11), and then operates the power switch 52 to activate the remote control panel 50 (S21).

When the remote control panel 50 is activated, the command communication portion 92 of the remote control panel 50 sends a negotiation request to the command communication portion 82 of the image forming apparatus 1 (S22). Next, the command communication portion 82 of the image forming apparatus 1 transmits a response signal to the command communication portion 92 of the remote control panel 50 (S12). When the remote control panel 50 receives the response signal, the connection sequence ends and the wireless communication is established.

Next, conditions for wireless communication, such as a communication speed and an image compression rate, are mutually set in the image forming apparatus 1 and the remote control panel 50 via the command communication portions 82 and 92 (S13, S23).

The remote control panel 50 can establish wireless communication not only with one image forming apparatus but also with a plurality of image forming apparatuses via the transmission and reception described above for each image forming apparatus, and perform the wireless communication described below.

When this setting is completed, the image data stored in the ROM 12 of the image forming apparatus 1 is transferred from the image transmitting portion 83 of the image forming apparatus 1 to the image receiving portion 93 of the remote control panel 50 in response to an instruction of the CPU 11 of the image forming apparatus 1 (S14).

Next, the CPU 21 of the remote control panel 50 converts the image data received via the image receiving portion 93 into an image, and displays the image on the display 51. For example, a main menu screen including the collective status display button 66 and illustrated in FIG. 7A or a main menu screen not including the collective status display button 66 and illustrated in FIG. 7B is displayed on the display 51.

After that, when the user operates the touch panel 59, the CPU 21 of the remote control panel 50 transmits the operation information of the touch panel 59 to the command communication portion 82 of the image forming apparatus 1 via the command communication portion 92 (S24). In this case, the CPU 21 transmits the operation information of the touch panel 59 to the image forming apparatus 1 as coordinate information. As described above, the touch panel 59 is arranged so as to overlap the display 51, and the user touches the display 51 with a finger to operate the touch panel 59.

The CPU 11 of the image forming apparatus 1 determines which position the user has touched on the touch panel 59 of the remote control panel 50 based on input coordinate data. Then, according to the touched position, the remote control panel 50 is instructed to transmit the image data, control lighting of a lighting unit 25, and instruct the speaker portion 53 to turn on and off the sound output (S15, 16).

Then, when the CPU 21 of the remote control panel 50 receives the image data via the image receiving portion 93, the CPU 21 displays the image data on the display 51. For example, a screen showing the status of one image forming apparatus or a collective status display screen for collectively displaying statuses of a plurality of image forming apparatuses is displayed on the display 51.

In addition to the case where the image forming apparatus 1 receives the operation information of the touch panel 59 from the remote control panel 50, the image forming apparatus 1 gives the above-mentioned instructions to the remote control panel 50 according to the status of the image forming apparatus 1 and the status of the remote control panel 50.

<Collective Status Display Screen of Remote Control Panel 50>

Next, screen transition when the touch panel 59 of the remote control panel 50 is operated to collectively display statuses will be described using FIGS. 7A and 7B. FIGS. 7A and 7B are diagrams illustrating examples of an image displayed on the display 51 of the remote control panel 50.

The display 51 of the remote control panel 50 first displays the main menu screen, which is the image illustrated in FIG. 7A or 7B, by default. The image (main menu screen) illustrated in FIG. 7A or FIG. 7B is transmitted from the image transmitting portion 83 to the image receiving portion 93 in the process of S14 illustrated in FIG. 6A described above.

On this main menu screen, a scan button 61 for setting the reader 14, a copy button 62 for setting the image forming unit 15, a fax button 63 for setting a facsimile, a display status button 64, and an arrow button 65 for switching the screen to the next page are displayed. Further, on the main menu screen, the name (MFP1 in this case) 69 of the image forming apparatus 1 currently to be operated and a set button 67 are displayed. Further, on the main menu screen, the collective status display button 66 (input unit) for inputting (instructing) to acquire statuses of a plurality of image forming apparatuses wirelessly connected to the remote control panel 50 is displayed.

In the configuration in which the collective status display button 66 is displayed on the display 51, the main menu screen including the collective status display button 66 is displayed on the display 51 as illustrated in FIG. 7A. The CPU 11 of the image forming apparatus 1 reads the image data stored in the ROM 12 and transmits the image data of the main menu screen including the collective status display button 66 to the remote control panel 50. The transmitted image data is received by the image receiving portion 93 of the remote control panel 50 and displayed on the display 51.

Alternatively, in a configuration in which the collective status display button 66 is not displayed on the display 51 and the collective status display key 68 (key operation input portion) is provided on the remote control panel 50, an image of the main menu screen that does not include the collective status display button 66 is displayed as illustrated in FIG. 7B. The CPU 11 of the image forming apparatus 1 reads the image data stored in the ROM 12 and transmits the image data of the main menu screen not including the collective status display button 66 to the remote control panel 50. The transmitted image data is received by the image receiving portion 93 of the remote control panel 50 and displayed on the display 51.

Alternatively, although not illustrated, in addition to the configuration in which the collective status display button 66 is displayed on the display 51, the remote control panel 50 may be provided with the hardware key of the collective status display key 68. In this case, as illustrated in FIG. 7A, the main menu screen including the collective status display button 66 is displayed on the display 51.

When the CPU 11 of the image forming apparatus 1 determines that the user has selected the copy button 62 from the coordinate data transmitted from the remote control panel 50, the CPU 11 of the image forming apparatus 1 transmits an image (not illustrated) of a copy instruction screen to the image receiving portion 93 via the image transmitting portion 83. As a result, the image (not illustrated) of the copy instruction screen is displayed on the display 51 of the remote control panel 50. In this way, the user operates the image forming apparatus 1 from the remote control panel 50.

When the user wants to change the image forming apparatus to be operated by the remote control panel 50, the user can change the image forming apparatus by operating the set button 67. The set button 67 on the main menu screen is selected to display a connection destination setting screen (not illustrated) on the display 51. On the connection destination setting screen (not illustrated), a list of image forming apparatuses that are wirelessly connected to the remote control panel 50 is displayed. For example, as illustrated in FIG. 8, it is assumed that four image forming apparatuses 1, 142, 143, and 144 whose names are "MFP1" to "MFP4" are wirelessly connected to the remote control panel 50. On the connection destination setting screen (not illustrated), one of the image forming apparatuses with the names "MFP1" to "MFP4" displayed in the list is selected as an image forming apparatus to be operated. When "MFP4" is selected as an apparatus to be operated, the name 69 of the image forming apparatus illustrated in FIG. 7A is changed to "MFP4", and MFP4 can be operated. In this way, one remote control panel 50 can switch the connection destination to operate a plurality of image forming apparatuses.

The establishment of wireless connection with a plurality of image forming apparatuses by the remote control panel 50 and the acquisition of the statuses of the plurality of image forming apparatuses with the established wireless connection will be described later.

<Control of Collective Status Display>

Figure 9:
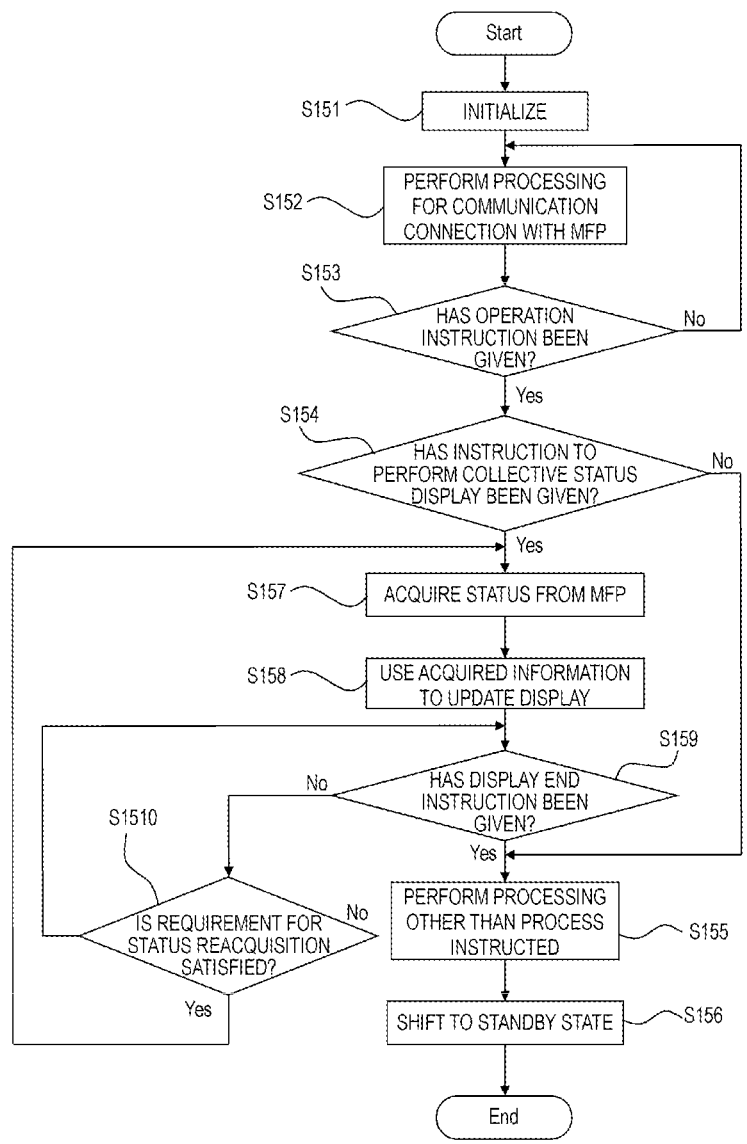
FIG. 9 is a flowchart of a process of collectively displaying statuses on the remote control panel.

Next, the control of the collective status display for collectively displaying statuses of a plurality of image forming apparatuses by one remote control panel will be described with reference to FIG. 9. FIG. 9 is a flowchart illustrating a process procedure for the collective status display by the CPU 21 (controller) of the remote control panel 50.

In the following case, as the plurality of image forming apparatuses, the four image forming apparatuses 1, 142, 143, 144 having the names "MFP1" to "MFP4" are exemplified as illustrated in FIG. 8. The four image forming apparatuses 1, 142, 143, and 144 are in a state in which their main power switches 79 are operated and activated, and are in a state in which the image forming apparatuses 1, 142, 143, and 144 can be wirelessly connected to the remote control panel 50.

Then, the user operates the power switch 52 of the remote control panel 50 to activate the remote control panel 50. Then, the process of the CPU 21 of the remote control panel 50 is started, and proceeds to S151 illustrated in FIG. 9.

In S151, the CPU 21 of the remote control panel 50 initializes the inside of the remote control panel 50. Then, the process of the CPU 21 shifts to S152.

In S152, the CPU 21 of the remote control panel 50 performs processing for communication connection to the image forming apparatus 1. The processing for the communication connection between the remote control panel 50 and the image forming apparatus 1 will be described with reference to FIG. 6A.

That is, when the remote control panel 50 is activated, a negotiation request is transmitted from the command communication portion 92 of the remote control panel 50 to the command communication portion 82 of the image forming apparatus 1 (S22). Next, the command communication portion 82 of the image forming apparatus 1 transmits a response signal to the command communication portion 92 of the remote control panel 50 (S12). When the remote control panel 50 receives the response signal, the connection sequence ends and wireless communication between the remote control panel 50 and the image forming apparatus 1 is established. The CPU 21 of the remote control panel 50 sets one image forming apparatus for which wireless communication has been established as an image forming apparatus currently to be operated by the remote control panel 50.

Next, conditions for wireless communication, such as a communication speed and an image compression rate, are mutually set in the image forming apparatus 1 and the remote control panel 50 via the command communication portions 82 and 92 (S13, S23). When this setting is completed, the image data stored in the ROM 12 is transmitted from the image transmitting portion 83 of the image forming apparatus 1 to the image receiving portion 93 of the remote control panel 50 according to an instruction of the CPU 11 of the image forming apparatus 1 (S14). In this case, the image data transmitted to the remote control panel 50 is the image data of the main menu screen including the collective status display button 66 illustrated in FIG. 7A.

In this case, the image data transmitted to the remote control panel 50 is not limited to the image data illustrated in FIG. 7A. In the configuration in which the collective status display button 66 is not displayed on the display 51 and the hardware key of the collective status display key 68 is provided on the remote control panel 50, the image data is the image data illustrated in FIG. 7B. In addition to the configuration (not illustrated) in which the collective status display button 66 is displayed on the display 51, the image data is the image data illustrated in FIG. 7A in the configuration in which the remote control panel 50 is provided with the hardware key of the collective status display key 68.

Next, the CPU 21 of the remote control panel 50 displays the image data received via the image receiving portion 93 on the display 51. In this case, the CPU 21 displays the main menu screen including the collective status display button 66 illustrated in FIG. 7A on the display 51. Then, the process of the CPU 21 shifts to S153. When there is no room to provide the collective status display button 66 on the screen layout, or when the user wants to be informed of a collective status display function, the hardware key of the collective status display key 68 may be provided. In the configuration in which the hardware key of the collective status display key 68 is provided on the remote control panel 50, image data to be displayed on the display 51 may be the image data illustrated in FIG. 7B or FIG. 7A.

In S153, the CPU 21 of the remote control panel 50 determines whether an operation instruction has been given by the user via the display 51 (touch panel 59) or the key operation input portion 26. When the CPU 21 determines that the operation instruction has been given by the user, the process of the CPU 21 shifts to S154. When the CPU 21 determines that the operation instruction has not given by the user, the process of the CPU 21 shifts to S152.

In S154, the CPU 21 determines whether the user has instructed to perform collectively display statuses. That is, the CPU 21 determines whether or not an instruction to acquire the statuses of the plurality of image forming apparatuses (four image forming apparatuses 1, 142, 143, 144 in this case) has been given via the collective status display button 66 (or the collective status display key 68). When the user operates the collective status display button 66 (or the collective status display key 68) of the touch panel 59 and the CPU 21 determines that the above-mentioned instruction has been given via the collective status display button 66, the process of the CPU 21 shifts to S157 to collectively display the statuses of the plurality of image forming apparatus. On the other hand, when the CPU 21 determines that an operation instruction other than the above-mentioned instruction has been provided via the collective status display button 66, the process of the CPU 21 shifts to S155.

It should be noted that the acquisition of the status of each image forming apparatus does not have to be performed only when the user gives an instruction to collectively display the statuses as a trigger, as in the above example. For example, the status may be transmitted from each image forming apparatus to the remote control panel 50 periodically (or at arbitrary times) such as every 60 seconds or every 30 seconds. The acquired information on the status of each image forming apparatus is temporarily stored in the RAM 23. Then, when the user gives an instruction to collectively display the statuses, the status of each image forming apparatus temporarily stored in the RAM 23 may be called. When the user does not instruct to perform the collective status display, the information regarding the status of each image forming apparatus and newly sent from each image forming apparatus is overwritten. In this way, the information regarding the status of each image forming apparatus and periodically acquired from each image forming apparatus may be used when the user gives an instruction to collectively display the statuses.

In S155, the CPU 21 performs processing other than the collective status display for which the operation instruction was given by the user in S154. That is, copying other than the collective status display and other operation instructions are performed on the image forming apparatus 1 currently to be operated. For example, when the display status button 64 illustrated in FIG. 7A is operated, the operation information of the touch panel 59 is transmitted to the command communication portion 82 of the image forming apparatus 1 via the command communication portion 92. Then, the CPU 11 of the image forming apparatus 1 acquires the status of the image forming apparatus 1, and transmits image data regarding the status of the image forming apparatus 1 from the image transmitting portion 83 of the image forming apparatus 1 to the image receiving portion 93 of the remote control panel 50. The CPU 21 of the remote control panel 50 displays the received image data on the display 51. In this way, the status of only one image forming apparatus 1 currently to be operated is displayed on the display 51. When the operation instructed is completed, the process of the CPU 21 shifts to S156.

In S156, the CPU 21 shifts to its standby state. That is, the remote control panel 50 shifts to its standby state and waits for the next instruction of the user.

In S157, the CPU 21 performs the process of collectively displaying statuses of a plurality of image forming apparatuses according to the operation instruction given from the user in S154. In the embodiment, the statuses are acquired from the four image forming apparatuses 1, 142, 143, and 144.

The CPU 21 establishes wireless connection with a plurality of image forming apparatuses to be operated (connection process) in response to an instruction given by the user via the collective status display button 66 (or the collective status display key 68) and sequentially acquires the statuses of the plurality of image forming apparatuses to be operated (acquisition process).

First, when the user presses the collective status display button 66, the CPU 21 transmits a negotiation request signal to a predetermined range from the command communication portion 92 of the remote control panel 50. Then, a response signal is transmitted from each of the command communication portions 82 of the image forming apparatuses 1, 142, 143, and 144 within the range of the above-mentioned signal to the command communication portion 92 of the remote control panel 50. The CPU 21 sequentially receives the response signal from each image forming apparatus, and sequentially establishes wireless connection to each image forming apparatus that has transmitted the response signal. For example, to perform Wi-Fi direct communication, the wireless communication portion 91 (third wireless communication unit) of the remote control panel 50 (wireless operation unit) connects to the wireless communication portion (corresponding to the first wireless communication unit) of the first image forming apparatus 1 via wireless communication without a wireless LAN router. Then, after the wireless communication connection between the wireless communication portion 91 and the first wireless communication unit is disconnected, the wireless communication portion 91 connects to the wireless communication portion (second wireless communication unit) of the second image forming apparatus 142 via wireless communication. In a method for communication without a wireless LAN router, such as Wi-Fi direct communication, the wireless communication portion 91 connects individually to each image forming apparatus. Therefore, to wirelessly communicate with another image forming apparatus, it is necessary to disconnect wireless communication connection to an image forming apparatus that was originally in a connected state.

The process of connecting the image forming apparatuses to each other via wireless communication in this way is referred to as a connection process. When the wireless communication portion 91 and the first wireless communication unit connect to each other via wireless communication in the connection process, the wireless communication portion 91 acquires status information (first status information) of the first image forming apparatus via wireless communication. This process corresponds to a first acquisition process. After that, the wireless communication portion 91 and the second wireless communication unit connect to each other via wireless communication again, and the wireless communication portion 91 acquires status information (second status information) of the second image forming apparatus via wireless communication. This process corresponds to a second acquisition process.

That is, when the collective status display button 66 is pressed by the user, the remote control panel 50 acquires status information of each image forming apparatus according to the following procedure.

(1) In the connection process (first connection process), the wireless communication connection between the wireless communication portion 91 and the first wireless communication unit is established.

(2) In the first acquisition process, the wireless communication portion 91 (acquiring unit) acquires the status information (first status information) of the first image forming apparatus via wireless communication.

(3) The connection process (second connection process) is resumed, and the wireless communication connection between the wireless communication portion 91 and the second wireless communication unit is established.

(4) In the second acquisition process, the wireless communication portion 91 (acquiring unit) acquires the status information (second status information) of the second image forming apparatus via wireless communication.

After that, the first status information and the second status information are displayed side by side on the display 51 (display process).

In this way, the CPU 21 identifies a plurality of image forming apparatuses to which a status acquisition command is transmitted, and acquires a list of the image forming apparatuses to be collectively displayed from the remote control panel 50.

Next, the CPU 21 of the remote control panel 50 transmits the status acquisition command to each of the command communication portions 82 of the image forming apparatuses 1, 142, 143, and 144 identified as targets of the collective status display via the command communication portion 92. Then, the CPU 11 of each of the image forming apparatuses transmits the status of the image forming apparatus to the command communication portion 92 of the remote control panel 50 via the command communication portion 82. In this way, the remote control panel 50 can acquire the status of each of the image forming apparatuses that are the targets of the collective status display. In the present embodiment, the case where any one of "printing", "standby", "sleep", and "JAM" is acquired as the status of each of the image forming apparatuses is exemplified. However, the status of each of the image forming apparatuses that is to be acquired is not limited thereto, and can be appropriately set to a status such as "out of paper" when there is no remaining sheet or "out of toner" when there is no remaining amount of toner. Then, the process of the CPU 21 shifts to S158.

In S158, the CPU 21 updates the display on the display 51 by using the status information acquired from each of the image forming apparatuses identified as the targets of the collective status display. Specifically, the CPU 21 transmits the status information acquired from the image forming apparatuses 1,142,143, and 144 to the command communication portion 82 of the image forming apparatus 1 currently to be operated via the command communication portion 92.

Then, the CPU 11 of the image forming apparatus 1 currently to be operated reads image data from the ROM 12, and transmits the read image data to the image receiving portion 93 of the remote control panel 50 via the image transmitting portion 83. Then, the CPU 21 of the remote control panel 50 updates the display on the display 51 by displaying the image data received via the image receiving portion 93 on the display 51. That is, the CPU 21 of the remote control panel 50 switches the screen displayed on the display 51 from the main menu screen illustrated in FIG. 7A or 7B to the collective status display screen in which the statuses of the image forming apparatuses illustrated in FIG. 10A are displayed side by side.

Figure 10A:
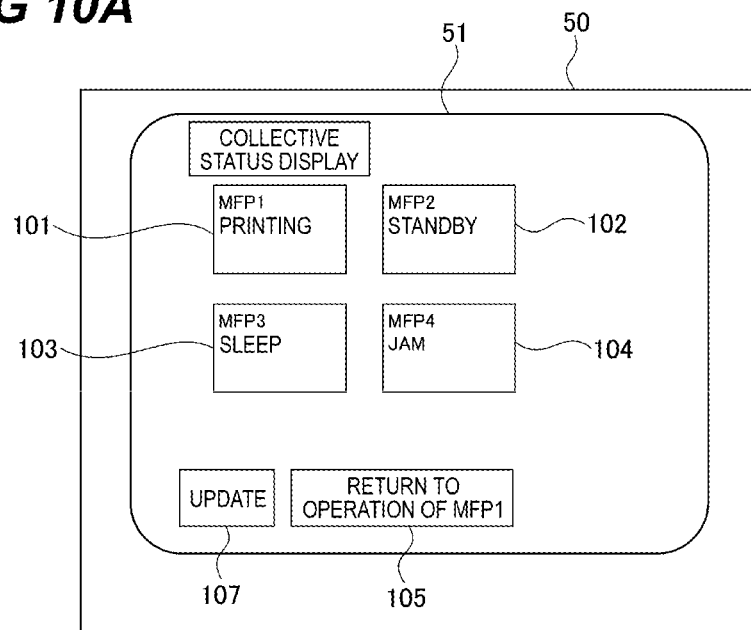
FIGS. 10A and 10B are diagrams illustrating examples of an image displayed on the display of the remote control panel.

The CPU 21 collectively displays the status 101 (first status information) of MFP1, the status 102 (second status information) of MFP2, the status 103 of MFP3, and the status 104 of MFP4 on the collective status display screen illustrated in FIG. 10A. A case is exemplified in which, on the collective status display screen illustrated in FIG. 10A, the status 101 of MFP1 is "printing", the status 102 of MFP2 is "standby", the status 103 of MFP3 is "sleep", and the status 104 of MFP4 is "JAM". As in this example, the "status information" includes information indicating whether or not image formation based on a job input to each image forming apparatus is being performed, the state of the power supply of each image forming apparatus, error information of each image forming apparatus, and the like. In addition, the "status information" also includes information indicating the number of jobs accepted by each image forming apparatus, and information indicating the type of an optional device connected to each image forming apparatus. Further, on the screen illustrated in FIG. 10A, the CPU 21 displays a button 105 for exiting the collective status display and returning to the operation of MFP1, and an update button 107. Then, the process of the CPU 21 shifts to S159. In this case, MFP1 is the name of the image forming apparatus 1, MFP2 is the name of the image forming apparatus 142, MFP3 is the name of the image forming apparatus 143, and MFP4 is the name of the image forming apparatus 144.

In S159, the CPU 21 determines whether a display end instruction has been given. In the embodiment, when the CPU 21 determines that the button 105 for returning to the operation of MFP1, which is the image forming apparatus 1 and currently to be operated, has been operated on the screen illustrated in FIG. 10A, the CPU 21 ends the collective status display and causes the process to shift to S155. When the user touches the status 101 of MFP1 and selects and operates the status display of the image forming apparatus 1, the CPU 21 ends the collective status display and the process shifts to S155 to perform a process of displaying only the status of the image forming apparatus 1. Otherwise, the CPU 21 causes the process to shift to S1510.

In S1510, the CPU 21 determines whether a condition for status reacquisition is satisfied. In the present embodiment, when the user operates the update button 107 on the screen illustrated in FIG. 10A, when another operation is performed on the screen illustrated in FIG. 10A, or when a certain time elapses from the time when the timer 24 starts counting time, the CPU 21 determines that the condition for the status reacquisition is satisfied, and the process of the CPU 21 shifts to S157. Otherwise, the process of the CPU 21 returns to S159.

As described above, according to the first embodiment, in the image forming system in which wireless communication can be performed between an image forming apparatus and the remote control panel, a user can operate the one remote control panel to collectively display statuses of a plurality of image forming apparatuses on the one remote control panel, and the convenience can be improved.

Second Embodiment

Next, an image forming system according to the second embodiment will be described. Since the schematic configuration of the entire image forming system is the same as that of the above-described embodiment, the description thereof will be omitted here.

In the present embodiment, in the case where statuses of a plurality of image forming apparatuses are displayed on the display 51 of the remote control panel 50, a detail of one selected image forming apparatus is displayed in addition to the status of each image forming apparatus. In this case, the detailed display of the one image forming apparatus is a more detailed status than the displayed statuses (simple display) of the plurality of image forming apparatus.

In the second embodiment, a process is performed according to the same flowchart illustrated in FIG. 9 as in the first embodiment. Since the overlapping parts have the same processing and the same reference signs, the description thereof will be omitted.

In S157 of the flowchart illustrated in FIG. 9, the CPU 21 of the remote control panel 50 transmits a status acquisition command to the command communication portion 82 of each of the image forming apparatuses 1, 142, 143, and 144 identified as targets of collective status display via the command communication portion 92. Then, the CPU 11 of each of the image forming apparatuses transmits the status of the image forming apparatus to the command communication portion 92 of the remote control panel 50 via the command communication portion 82.

In this case, in the above-described embodiment, the CPU 21 acquires any one of "printing", "standby", "sleep", and "JAM" as the status of each image forming apparatus that is to be acquired. On the other hand, in the present embodiment, for one selected image forming apparatus, not only the status of the above-mentioned image forming apparatus, but also the size, type, and remaining amount of a sheet stored in a sheet cassette and a remaining amount of a processing device are acquired as the status of the image forming apparatus. In this case, the one selected image forming apparatus sets the one image forming apparatus (MFP) selected as the image forming apparatus currently to be operated as a detailed display target in S152 of the flowchart illustrated in FIG. 9.

Then, in S158 of the flowchart illustrated in FIG. 9, the CPU 21 updates the display on the display 51 by using the status information acquired from each of the image forming apparatuses identified as the targets of the collective status display. Specifically, the CPU 21 transmits the status information acquired from the image forming apparatuses 1, 142, 143, and 144 to the command communication portion 82 of the image forming apparatus 1 currently to be operated via the command communication portion 92. Then, the CPU 11 of the image forming apparatus 1 currently to be operated reads image data from the ROM 12 according to the acquired status information of each image forming apparatus, and transmits the read image data to the image receiving portion 93 of the remote control panel 50 via the image transmitting portion 83. Then, the CPU 21 of the remote control panel 50 updates the display on the display 51 by displaying the image data received via the image receiving portion 93 on the display 51. That is, the CPU 21 of the remote control panel 50 switches the screen displayed on the display 51 from the main menu screen illustrated in FIG. 7A or 7B to a collective status display screen illustrated in FIG. 10B.

That is, the remote control panel 50 collectively displays, on the display 51, the simple display (101 to 104) indicating the statuses of the plurality of image forming apparatuses and the detailed display (110) indicating a more detailed status of one of the plurality of image forming apparatuses than the simple display.

Figure 10B:
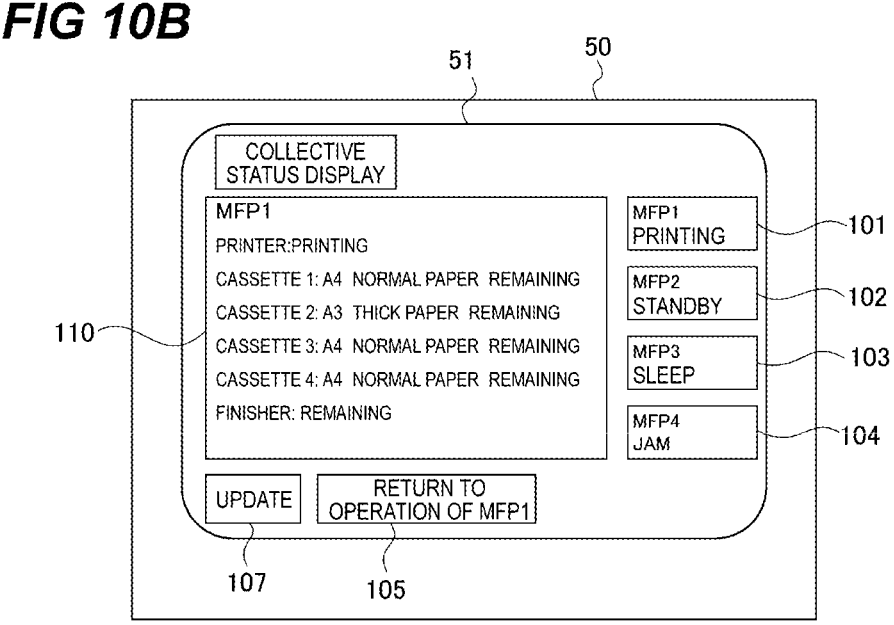

The CPU 21 displays the detailed display 110 of the MFP1, which is one selected image forming apparatus 1, on the collective status display screen illustrated in FIG. 10B. Further, the status 101 (simple display) of MFP1, the status 102 (simple display) of MFP2, the status 103 (simple display) of MFP3, and the status 104 (simple display) of MFP4 are displayed side by side next to the detailed display 110 of MFP1 from the upper side to the lower side of the screen. MFP1 to MFP4 are the plurality of image forming apparatuses to be operated. The detailed display 110 of the one selected MFP is displayed in a larger region than a region in which the status (simple display) of each MFP to be operated is displayed. Further, the CPU 21 displays a button 105 for exiting the collective status display and returning to the operation of the image forming apparatus 1, and an update button 107 on the screen illustrated in FIG. 10B.

As illustrated in FIG. 10A, status information of each image forming apparatus has an item. In FIG. 10A, an example of the status information of MFP1 has only one item. However, the number of items displayed in this case is not limited to one, and may be two or more. As illustrated in FIG. 10B, a plurality of items constituting the status information is present on a detailed display screen. At least, the number (second number) of items that constitute the status information displayed on the detailed display screen is greater than the number (first number) of items that constitute the status information displayed on a simple display screen. By displaying the details in this way, the status information of each image forming apparatus can be displayed in detail.

Further, in S1510 of the flowchart illustrated in FIG. 9, when the user touches and selects any of the statuses 101 to 104 of the four MFPs on the screen displayed on the display 51 and illustrated in FIG. 10B, the CPU 21 determines that the condition for reacquiring the status of the image forming apparatus is satisfied. That is, when the user touches and selects any of the statuses 101 to 104 of the MFPs displayed on the display 51, the one selected MFP is set as a target for the detailed display. In that case, the process of the CPU 21 shifts to S157. Then, the detailed status of the MFP selected in S157 is acquired, and the detailed status of the MFP selected in S158 is changed to be a status displayed in the detailed display 110 in the larger region. For example, the user touches the status 104 of MFP4, which is the name of the image forming apparatus 144, among the statuses 101 to 104 of the four MFPs on the screen illustrated in FIG. 10B. Then, the screen displayed on the display 51 is switched from the collective status display screen including the detailed display 110 of MFP1 illustrated in FIG. 10B to a collective status display screen including the detailed display 110 of MFP4 illustrated in FIG. 14B.

Other configurations and processes are the same as those described in the first embodiment, and the description thereof is omitted here.

As described above, according to the second embodiment, the user can collectively display statuses of a plurality of image forming apparatuses on one remote control panel by operating the one remote control panel, and refer to detailed display of one selected apparatus, and the convenience can be improved.

Third Embodiment

Next, an image forming system according to the third embodiment will be described. Since the schematic configuration of the entire image forming system is the same as those of the above-described embodiments, the description thereof will be omitted here.

In the present embodiment, the display 51 of the remote control panel 50 is used to collectively display statuses of a plurality of image forming apparatuses. In this case, among the acquired statuses of the image forming apparatuses, the status of an image forming apparatus in an important status that needs to be called to the user's attention is displayed by a method different from that for the other image forming apparatuses.

In the present embodiment, the image forming apparatus in the important status is displayed on the display 51 as telop display. In this case, the telop display means that characters to be displayed are displayed so as to flow in the horizontal direction of the screen. In the telop display, the next still image, which is slightly different from the previous still image, is sequentially transmitted from the image forming apparatus and displayed on the display of the remote control panel, so that the image (characters to be displayed) is displayed to flow on the display.

It is defined that the response (that is, the status of the image forming apparatus) of the image forming apparatus that receives a status acquisition command from the remote control panel 50 is one of "printing", "standby", "sleep", and "JAM". Further, among the acquired statuses (responses) of the image forming apparatuses, a response, which indicates an important status that needs to be called to the user's attention, is defined as "JAM". In this case, the CPU 21 of the remote control panel 50 causes a response ("JAM" in this case) determined to indicate the important status to be stored in the ROM 22 and determines the response in advance. When the response obtained in response to the status acquisition command matches the stored response, the CPU 21 determines that the image forming apparatus is in the important status. The type of response of the image forming apparatus to the status acquisition command and the important status indicated by the response are not limited thereto, and should be set as appropriate.

In the third embodiment, a process is performed according to the same flowchart illustrated in FIG. 9 as in the first embodiment. Since the overlapping parts have the same processing and the same reference signs, the description thereof will be omitted.

In S157 of the flowchart illustrated in FIG. 9, the CPU 21 of the remote control panel 50 transmits a status acquisition command to the command communication portion 82 of each of the image forming apparatuses 1,142,143, and 144 identified as targets of the collective status display via the command communication portion 92. Then, the CPU 11 of each of the image forming apparatuses transmits the status of the image forming apparatus to the command communication portion 92 of the remote control panel 50 via the command communication portion 82.

Then, in S158 of the flowchart illustrated in FIG. 9, the CPU 21 updates the display on the display 51 by using the status information acquired from each of the image forming apparatuses identified as the targets of the collective status display. Specifically, the CPU 21 transmits the status information acquired from the image forming apparatuses 1,142, 143, and 144 to the command communication portion 82 of the image forming apparatus 1 currently to be operated via the command communication portion 92. Then, the CPU 11 of the image forming apparatus 1 currently to be operated reads image data from the ROM 12, and transmits the read image data to the image receiving portion 93 of the remote control panel 50 via the image transmitting portion 83.

In this case, the CPU 21 of the remote control panel 50 causes a response determined to indicate the important status to be stored in the ROM 22 and determines the response in advance. When the response obtained in response to the status acquisition command matches the response stored in the ROM 22, the CPU 21 determines that the image forming apparatus is in the important status. Then, the CPU 21 of the remote control panel 50 transmits information according to this determination to the image forming apparatus 1, and acquires image data corresponding to the information from the image forming apparatus 1.

Figure 11A:
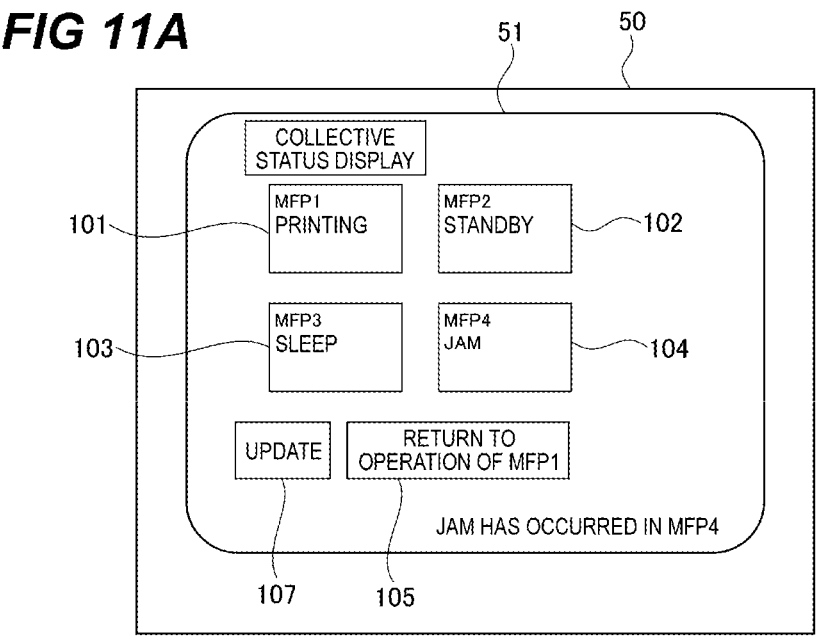
FIGS. 11A and 11B are diagrams illustrating examples of an image displayed on the display of the remote control panel.

Then, the CPU 21 of the remote control panel 50 updates the display on the display 51 by displaying the image data received via the image receiving portion 93 on the display 51. That is, the CPU 21 of the remote control panel 50 switches the screen displayed on the display 51 from the main menu screen illustrated in FIG. 7A or 7B to a collective status display screen illustrated in FIG. 11A.

Figure 11B:
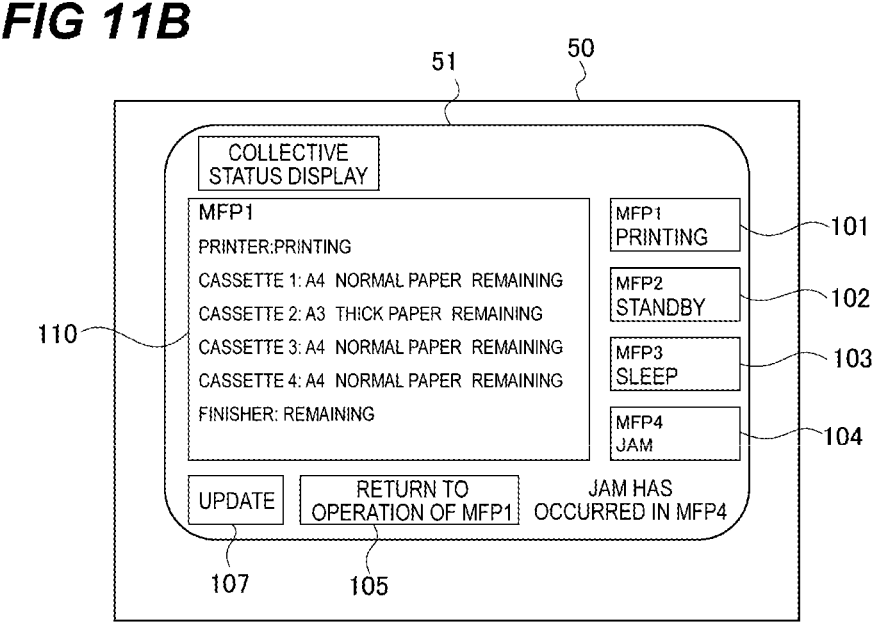

Alternatively, when one selected image forming apparatus is set, the screen displayed on the display 51 may be switched to a collective status display screen illustrated in FIG. 11B.

As a result, on the display 51 of the remote control panel 50, the status of the MFP determined to be in the important status (JAM of MFP4 occurs in this case) is displayed as a telop in addition to the collectively displayed statuses of the MFPs. That is, on the screen illustrated in FIG. 11A, the statuses of the MFPs are collectively displayed, and the occurrence of JAM of MFP4 in the important status is displayed as a telop. On the screen illustrated in FIG. 11B, the detailed display of one selected MFP and the status of each MFP are collectively displayed, and the occurrence of JAM of MFP 4 in the important status is displayed as a telop.

Other configurations and processes are the same as those described in the first embodiment, and the description thereof is omitted here.

As described above, according to the third embodiment, the user can be notified of the important status of the image forming apparatus while collectively displaying the statuses of the plurality of image forming apparatuses by operating from the one remote control panel, and the convenience can be improved.

Fourth Embodiment

Next, an image forming system according to the fourth embodiment will be described. Since the schematic configuration of the entire image forming system is the same as those of the above-described embodiments, the description thereof will be omitted here.

In the present embodiment, the display 51 of the remote control panel 50 is used to collectively display statuses of a plurality of image forming apparatuses. In this case, a status display region for an important status that is among the acquired statuses of the image forming apparatuses and needs to be called to the user's attention is displayed in a method different from that of other status display regions. Specifically, the status display region of the image forming apparatus that needs to be called to the user's attention is displayed by changing a color of the status display region, blinking the status display region, displaying a symbol (mark) that is called to the user's attention, or changing the position of the status display region.

In this case, blinking the status display region means that, similarly to the telop display, the next still image slightly different from the previous still image is sequentially transmitted from the image forming apparatus and displayed on the display of the remote control panel, and blinks on the display.

Further, among the acquired statuses of the image forming apparatuses, the important status that needs to be called to the user's attention is the same as that in the third embodiment described above. Then, the CPU 21 of the remote control panel 50 causes a response determined to indicate the important status to be stored in the ROM 22 and determines the response in advance. When the response obtained in response to the status acquisition command matches the response stored in the ROM 22, the CPU 21 determines that the image forming apparatus is in the important status. This is also the same as the third embodiment described above.

In the fourth embodiment, a process is performed according to the same flowchart illustrated in FIG. 9 as in the first embodiment. Since the overlapping parts have the same processing and the same reference signs, the description thereof will be omitted.

Then, in S158 of the flowchart illustrated in FIG. 9, the CPU 21 updates the display on the display 51 by using the status information acquired from each of the image forming apparatuses identified as the targets of the collective status display. Specifically, the CPU 21 transmits the status information acquired from the image forming apparatuses 1,142, 143, and 144 to the command communication portion 82 of the image forming apparatus 1 currently to be operated via the command communication portion 92. Then, the CPU 11 of the image forming apparatus 1 currently to be operated reads image data from the ROM 12, and transmits the read image data to the image receiving portion 93 of the remote control panel 50 via the image transmitting portion 83.

In this case, the CPU 11 of the image forming apparatus 1 stores a response determined to indicate the important status to be stored in the ROM 22 and determines the response in advance. When the response obtained in response to the status acquisition command matches the response stored in the ROM 22, the CPU 11 determines that the image forming apparatus is in the important status. Then, the CPU 21 of the remote control panel 50 transmits information according to this determination to the image forming apparatus 1, and acquires image data corresponding to the information from the image forming apparatus 1.

Figure 12A:
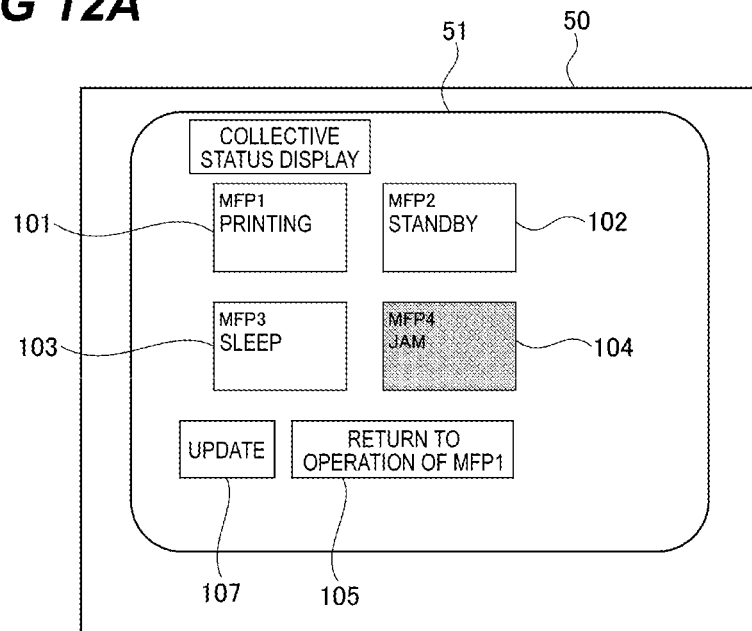
FIGS. 12A and 12B are diagrams illustrating examples of an image displayed on the display of the remote control panel.

Then, the CPU 21 of the remote control panel 50 updates the display on the display 51 by displaying the image data received via the image receiving portion 93 on the display 51. That is, the CPU 21 of the remote control panel 50 switches the screen displayed on the display 51 from the main menu screen illustrated in FIG. 7A or 7B to a collective status display screen illustrated in FIG. 12A. In this case, the CPU 21 changes the status display region of MFP4 to a color (red) different from other status display regions and displays the status display region of MFP4.

Figure 12B:
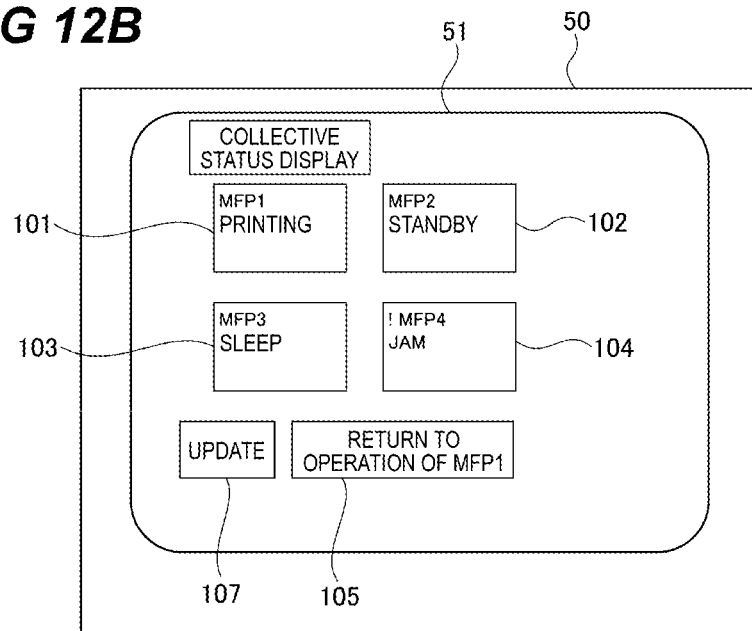

Alternatively, the CPU 21 of the remote control panel 50 switches the screen displayed on the display 51 to a collective status display screen illustrated in FIG. 12B. In this case, the CPU 21 displays the important status by adding a caution symbol (mark !) in front of the name of MFP4 in the status JAM in the status display region of MFP4.

Figure 13A:
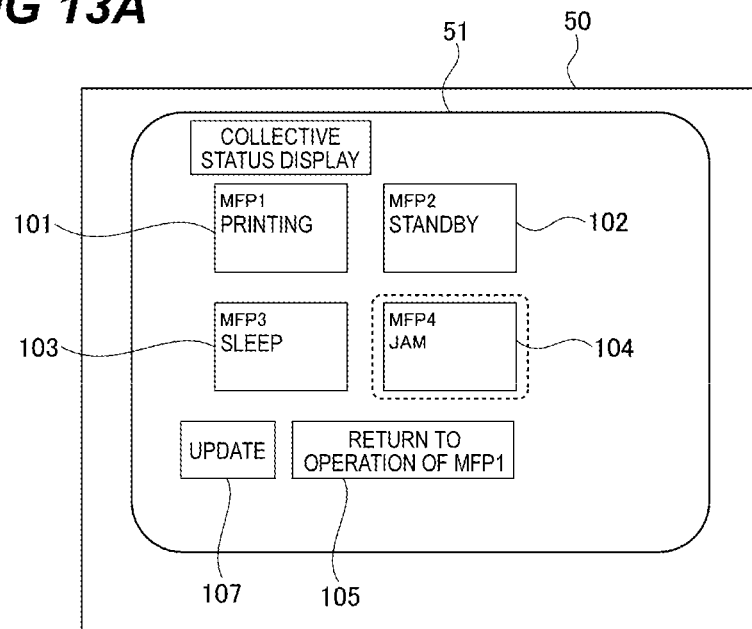
FIGS. 13A and 13B are diagrams illustrating examples of an image displayed on the display of the remote control panel.

Alternatively, the CPU 21 of the remote control panel 50 switches the screen displayed on the display 51 to a collective status display screen illustrated in FIG. 13A. In this case, the CPU 21 blinks the status display region of MFP4 and displays the important status.

Figure 13B:
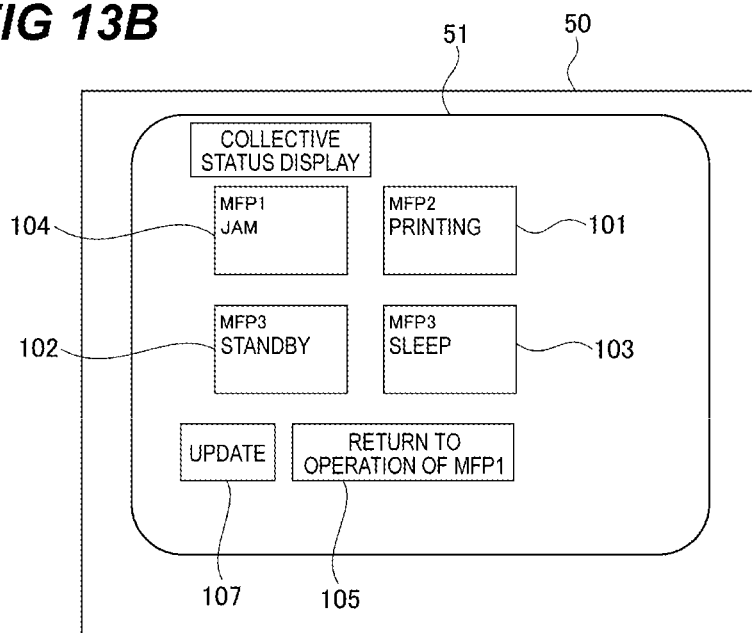

Alternatively, the CPU 21 of the remote control panel 50 switches the screen displayed on the display 51 to a collective status display screen illustrated in FIG. 13B. In this case, the CPU 21 changes the order of the status display regions of the MFPs and displays the statuses of the MFPs such that the status display region of MFP4 in the important status is at a noticeable position (on the upper left side of the screen in this case) on the screen and the status display regions of the other MFPs are at positions following the noticeable position. That is, the CPU 21 displays the status display regions of the MFPs in order from the status display region of MFP4 in the important status while prioritizing the status display region of MFP4 in the important status over the status display regions of the other MFPs.

Figure 14A:
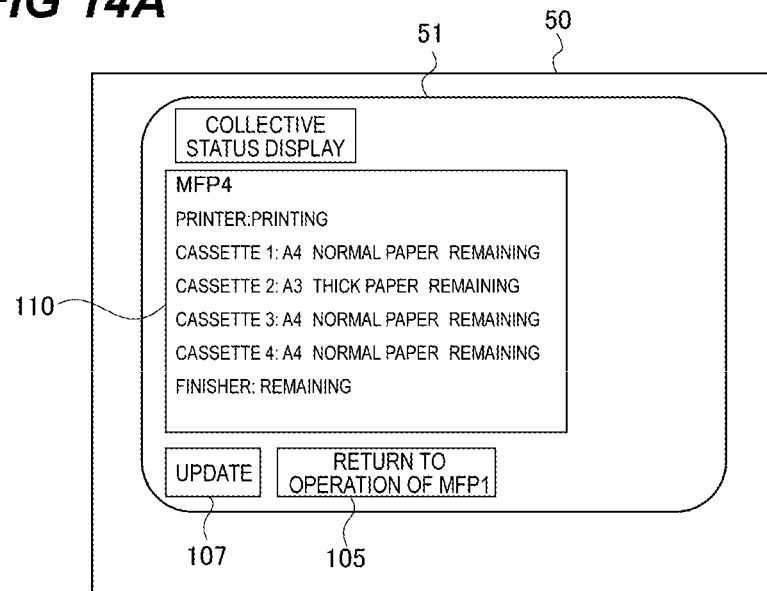
FIGS. 14A and 14B are diagrams illustrating examples of an image displayed on the display of the remote control panel.

Alternatively, the CPU 21 of the remote control panel 50 switches the screen displayed on the display 51 to the collective status display screen illustrated in FIG. 10A, and further switches the screen to a detailed display screen of the MFP in the important status as illustrated in FIG. 14A. In this case, the CPU 21 collectively displays the status of each MFP as illustrated in FIG. 10A. After that, as illustrated in FIG. 14A, the CPU 21 switches the screen to a screen in which the detailed display 110 of MFP4 and the button 105 for returning to the operation of the image forming apparatus 1 are displayed as illustrated in FIG. 14A for the status of MFP4 in the important status among MFPs collectively displayed.

Other configurations and processes are the same as those described in the first embodiment, and the description thereof is omitted here.

As described above, according to the fourth embodiment, when the user collectively displays statuses of a plurality of image forming apparatuses on one remote control panel by operating from the one remote control panel, the important status of the image forming apparatus can be notified to the user, and convenience can be improved.

Fifth Embodiment

Next, an image forming system according to the fifth embodiment will be described. Since the schematic configuration of the entire image forming system is the same as those of the above-described embodiments, the description thereof will be omitted here.

The fifth embodiment is a combination of the configuration described in the second embodiment and the configuration described in the fourth embodiment.

That is, in the fifth embodiment, as described with reference to FIG. 10B, in the case where statuses of a plurality of image forming apparatuses are collectively displayed on the display 51 of the remote control panel 50, the status of each image forming apparatus and detailed display of one selected image forming apparatus are displayed. In this case, the detailed display of the one image forming apparatus is a more detailed status than the displayed statuses (simple display) of the plurality of image forming apparatus.

Moreover, in the fifth embodiment, the statuses of the plurality of image forming apparatuses are collectively displayed on the display 51 of the remote control panel 50. In this case, as described with reference to FIGS. 12A to 13B and 14A, a status display region for displaying a status that is among the acquired statuses of the image forming apparatuses and needs to be called to the user's attention is displayed in a different manner from the other status display regions.

Specifically, the CPU 21 of the remote control panel 50 switches the screen displayed on the display 51 from the main menu screen illustrated in FIG. 7A or 7B to a collective status display screen illustrated in FIG. 15A, 15B, 16A, 16B, or 14B.

That is, the remote control panel 50 collectively displays, on the display 51, the simple display (101 to 104) indicating the statuses of the plurality of image forming apparatuses and the detailed display (110) indicating a more detailed status of one of the plurality of image forming apparatuses than the simple display.

Figure 15A:
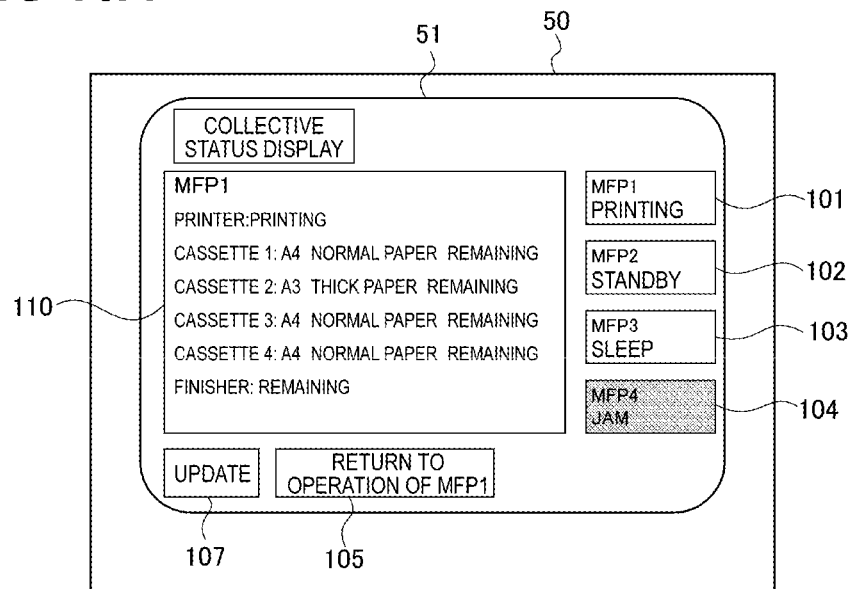
FIGS. 15A and 15B are diagrams illustrating examples of an image displayed on the display of the remote control panel.

On the collective display screen illustrated in FIG. 15A, the detailed display 110 of MFP1, which is the one selected image forming apparatus 1, is displayed. Further, the status 101 (simple display) of MFP1, the status 102 (simple display) of MFP2, the status 103 (simple display) of MFP3, and the status 104 (simple display) of MFP4 are displayed side by side next to the detailed display 110. MFP1 to MFP4 are the plurality of image forming apparatuses to be operated. Moreover, the status display region of MFP4 is changed to a color (red) different from the other status display regions and the important status is displayed. In this case, as described above, the important status is a status that needs to be called to the user's attention among the acquired statuses of the image forming apparatuses.

Figure 15B:
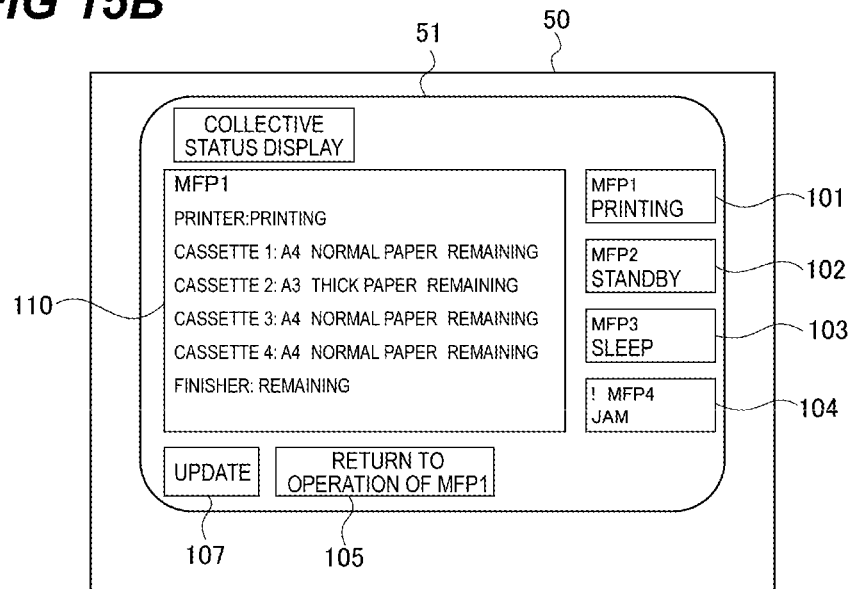

On the collective display screen illustrated in FIG. 15B, the detailed display 110 of MFP1, which is the one selected image forming apparatus 1, and the statuses 101 to 104 (simple display) of MFP1 to MFP4, which are the plurality of image forming apparatuses to be operated, are displayed side by side from the top to the bottom of the screen. In addition, the important status is displayed by adding a caution symbol (mark !) in front of the name of MFP4 in the status JAM in the status display region of MFP4.

Figure 16A:
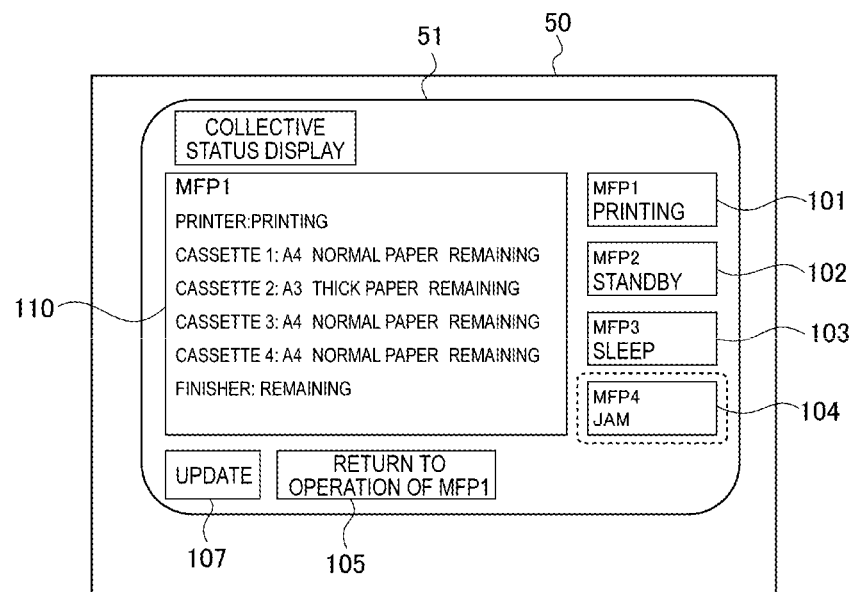
FIGS. 16A and 16B are diagrams illustrating examples of an image displayed on the display of the remote control panel.

On the collective display screen illustrated in FIG. 16A, the detailed display 110 of MFP1, which is the one selected image forming apparatus 1, and the statuses 101 to 104 (simple display) of MFP1 to MFP4, which are the plurality of image forming apparatuses to be operated, are displayed side by side from the top to the bottom of the screen. In addition, the status display region of MFP4 is blinked and the important status is displayed.

Figure 16B:
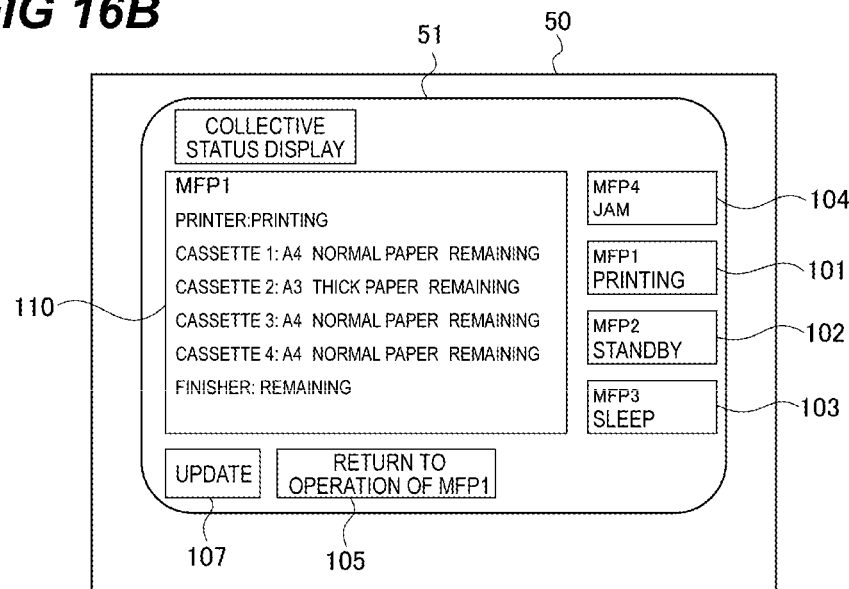

On the collective display screen illustrated in FIG. 16B, the detailed display 110 of MFP1, which is the one selected image forming apparatus 1, and the statuses 101 to 104 (simple display) of MFP1 to MFP4, which are the plurality of image forming apparatuses to be operated, are displayed side by side from the top to the bottom of the screen. In addition, the order of the status display regions of the MFPs is changed such that the status display region of MFP4 in the important status is at a noticeable position (upper side of the screen) on the screen, and the status display regions of the other MFPs are at positions following the noticeable position. That is, the status display regions of the MFPs are displayed in order from the status display region of MFP4 in the important status, while the status display region of MFP4 is prioritized over the status display regions of the other MFPs.

Figure 14B:
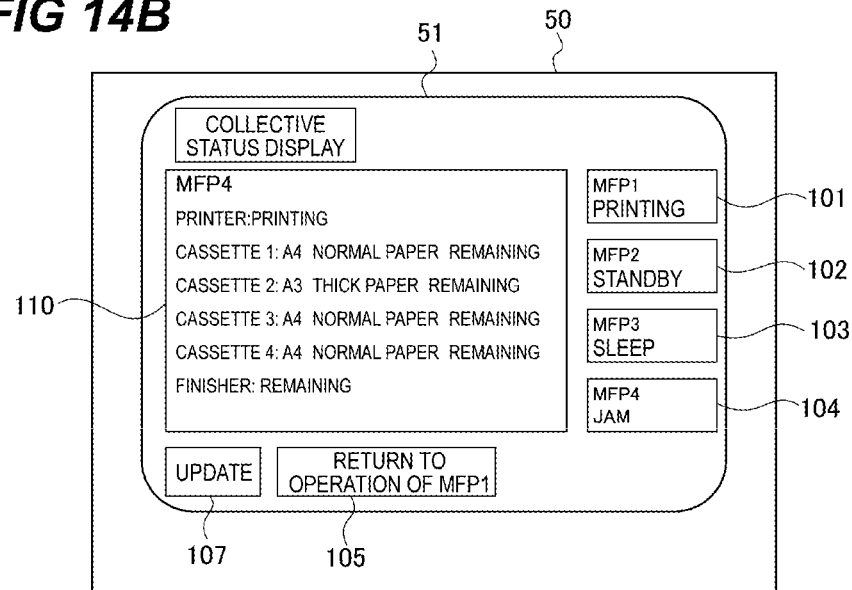

The collective display screen illustrated in FIG. 14B can be switched as follows. The CPU 21 of the remote control panel 50 switches the screen displayed on the display 51 from the main menu screen illustrated in FIG. 7A or 7B to the collective status display screen illustrated in FIG. 10B, and further switches the screen to the detailed display screen of the MFP in the important status illustrated in FIG. 14B. After displaying the detailed display of the one selected MFP and collectively displaying the statuses of the MFPs as illustrated in FIG. 10A, the CPU 21 switches the screen to the screen in which the detailed display 110 of MFP4 in the important status among the MFPs is displayed as illustrated in FIG. 14B.

In the fifth embodiment, a process is performed according to the flowchart illustrated in FIG. 9, which is the same as in the first embodiment. Further, a process procedure from the transmission of a status acquisition command from the CPU of the remote control panel to switching to the collective status display screen illustrated in FIG. 15A, 15B, 16A, 16B, or 14B is almost the same as the above-mentioned embodiment. Therefore, the description thereof is omitted here.

As described above, according to the fifth embodiment, when the user collectively displays statuses of a plurality of image forming apparatuses on one remote control panel by operating from the one remote control panel, the important status of an image forming apparatus can be notified to the user, and the convenience can be improved.

Sixth Embodiment

Next, an image forming system according to the sixth embodiment will be described. Since the schematic configuration of the entire image forming system is the same as those of the above-described embodiments, the description thereof will be omitted here.

In the sixth embodiment, a process of setting a multiple apparatus display mode or a single apparatus detailed display mode is added. In the multiple apparatus display mode, statuses of a plurality of image forming apparatuses are collectively displayed. In the single apparatus detailed display mode, the statuses of the plurality of image forming apparatuses are collectively displayed and detailed display of one of the plurality of image forming apparatuses is displayed. The display mode set in this case is stored in the ROM 22 of the remote control panel 50. The CPU 21 of the remote control panel 50 collectively displays statuses of a plurality of image forming apparatuses on the display 51 immediately after the remote control panel 50 is activated according to the display mode stored in the ROM 22. In this case, the detailed display of the one image forming apparatus is a more detailed status than the displayed statuses (simple display) of the plurality of image forming apparatus.

Figure 17:
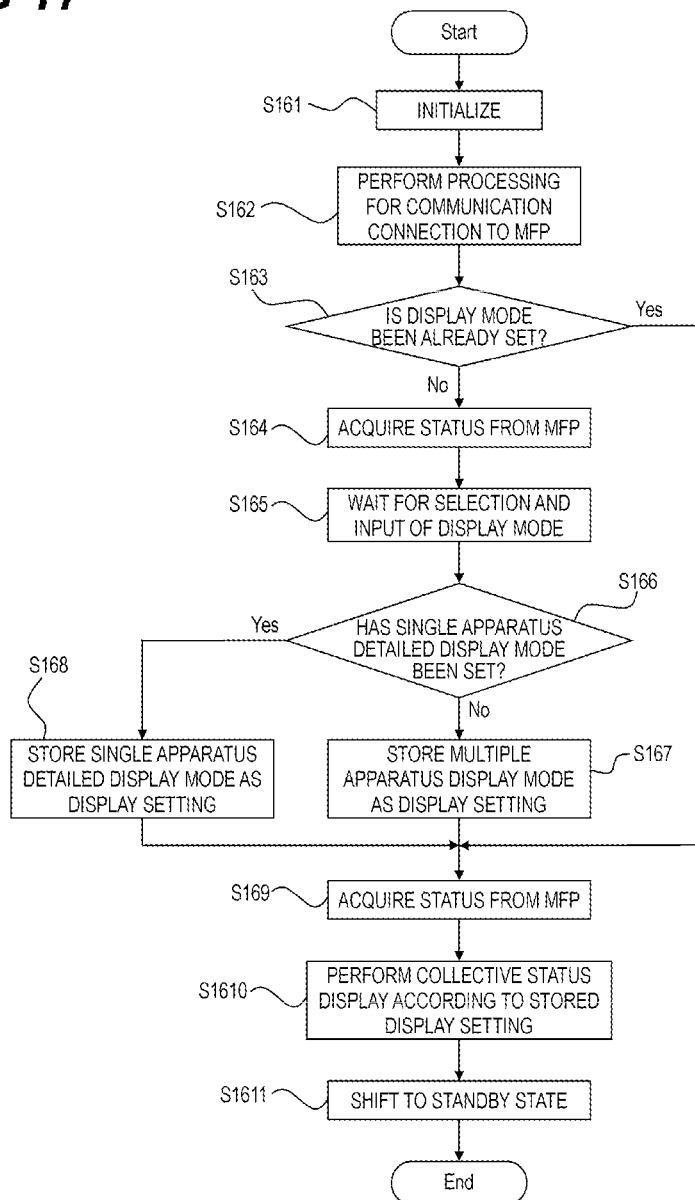
FIG. 17 is a flowchart of a process of collectively displaying statuses on the remote control panel.

Note that FIG. 17 illustrates a flowchart of a process of setting the collective status display of the remote control panel according to the sixth embodiment. Except for the mode setting described with reference to FIG. 17, a process is performed according to the flowchart illustrated in FIG. 9 in the first embodiment. In the sixth embodiment, the case where a series of additional processes of setting the display mode illustrated in FIG. 17 is performed by the initialization routine of S151, which is the first process of the flowchart illustrated in FIG. 9, will be described as an example.

The remote control panel 50 according to the sixth embodiment displays a screen for setting the display mode, prompts the user to set the display mode, stores the set display mode in the ROM, and performs the collective status display according to the setting for the display mode stored in the ROM immediately after the activation of the remote control panel 50.

<Additional Process of Controlling Collective Status Display>

Next, with reference to FIG. 17, an additional process of controlling the collective status display (FIG. 9) for collectively displaying statuses of a plurality of image forming apparatuses by one remote control panel will be described.

In the following case, as the plurality of image forming apparatuses, the four image forming apparatuses 1, 142, 143, 144 having the names "MFP1" to "MFP4" are exemplified as illustrated in FIG. 8. The four image forming apparatuses 1, 142, 143, and 144 are in a state in which their main power switches 79 are operated and activated, and are in a state in which the image forming apparatuses 1, 142, 143, and 144 can be wirelessly connected to the remote control panel 50.

Then, the user operates the power switch 52 of the remote control panel 50 to activate the remote control panel 50. Then, the process of the CPU 21 of the remote control panel 50 is started, and proceeds to S151 illustrated in FIG. 9. In the initialization routine of S151 illustrated in FIG. 9, the series of processes illustrated in FIG. 17 is performed. After the series of processes is performed, the process proceeds to S153 illustrated in FIG. 9. The series of additional processes illustrated in FIG. 17 will be described below.

In S161, the CPU 21 of the remote control panel 50 initializes the inside of the remote control panel 50. Then, the process of the CPU 21 shifts to S162.

In S162, the CPU 21 of the remote control panel 50 performs processing for communication connection to the image forming apparatus 1. In this case, the processing for the communication connection between the remote control panel 50 and the image forming apparatus 1 has been described with reference to FIG. 6A in the first embodiment described above, and thus is omitted here. Then, after the processing for the communication connection is performed, the process of the CPU 21 shifts to S163.

In S163, the CPU 21 of the remote control panel 50 determines whether or not the display mode has been set by referring to the setting for the display mode stored in the ROM 22 of the remote control panel 50. When the remote control panel 50 is activated for the first time, the display mode is not set, so the process of the CPU 21 shifts to S164. When the remote control panel 50 is activated after the display mode is set, the display mode has already been set, so the process of the CPU 21 shifts to S169.

In S164, the CPU 21 acquires the statuses from the image forming apparatuses. In this embodiment, the CPU 21 acquires each of the statuses from the four image forming apparatuses 1, 142, 143, and 144.

First, the CPU 21 transmits a negotiation request signal to a predetermined range from the command communication portion 92 of the remote control panel 50. Then, a response signal is transmitted from each of the command communication portions 82 of the image forming apparatuses 1, 142, 143, and 144 within the range of the above-mentioned signal to the command communication portion 92 of the remote control panel 50. The CPU 21 sequentially receives the response signal from each image forming apparatus, and sequentially establishes wireless connection to each image forming apparatus that has transmitted the response signal. In this way, the CPU 21 identifies a plurality of image forming apparatuses to which the status acquisition command is transmitted, and acquires a list of the image forming apparatuses to be collectively displayed from the remote control panel 50.

Next, the CPU 21 of the remote control panel 50 transmits the status acquisition command to each of the command communication portions 82 of the image forming apparatuses 1, 142, 143, and 144 identified as targets of the collective status display via the command communication portion 92. Then, the CPU 11 of each of the image forming apparatuses transmits the status of the image forming apparatus to the command communication portion 92 of the remote control panel 50 via the command communication portion 82. In this way, the remote control panel 50 can acquire the status of each of the image forming apparatuses that are the targets of the collective status display.

In the present embodiment, the case where any one of "printing", "standby", "sleep", and "JAM" is acquired as the status of each of the image forming apparatuses is exemplified. However, the status of each of the image forming apparatuses that is to be acquired is not limited thereto, and can be appropriately set to a status such as "out of paper" when there is no remaining sheet or "out of toner" when there is no remaining amount of toner. Then, the process of the CPU 21 shifts to S165.

Figure 18A:
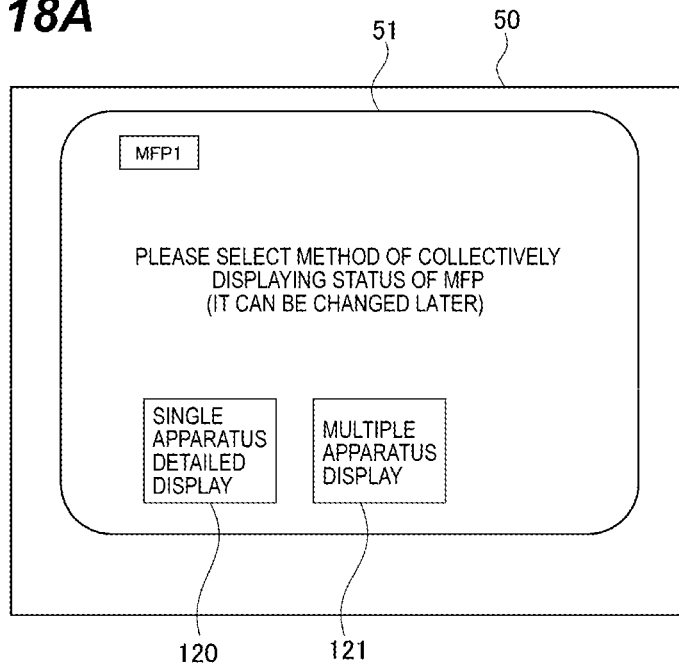
FIGS. 18A and 18B are diagrams illustrating examples of an image displayed on the display of the remote control panel.

In S165, the CPU 21 of the remote control panel 50 performs a selection input process on the display mode. The CPU 21 transmits the status information acquired from the four image forming apparatuses 1, 142, 143, and 144 to the image forming apparatus 1 currently to be operated via the command communication portion 92. Then, the CPU 11 of the image forming apparatus 1 currently to be operated reads image data from the ROM 12 and transmits the read image data to the image receiving portion 93 of the remote control panel 50 via the image transmitting portion 83. Then, the CPU 21 of the remote control panel 50 displays the image data received via the image receiving portion 93 on the display 51. Specifically, the display 51 displays a setting screen in which a single apparatus detailed display button 120 for selecting the single apparatus detailed display mode as illustrated in FIG. 18A and a multiple apparatus display button 121 for selecting the multiple apparatus display mode are displayed, and prompts the user to select a setting for the collective status display. When the CPU 21 detects that one of the buttons has been selected by the user, the process of the CPU 21 shifts to S166.

Alternatively, in the standby state of the image forming apparatus, the user may operate the set button 67 on the screen illustrated in FIG. 7A or 7B to perform the above-mentioned selection input process of S165.

In S166, the CPU 21 determines whether the user has set the single apparatus detailed display mode (single apparatus detailed display setting) and branches the process. When the CPU 21 determines that an instruction has been given by operating the single apparatus detailed display button 120 on the touch panel 59, the process of the CPU 21 shifts to S168. On the other hand, when the CPU 21 determines that an instruction has been given by operating the multiple apparatus display button 121 on the touch panel 59, the process of the CPU 21 shifts to S167.

In S167, the CPU 21 causes the multiple apparatus display mode corresponding to the instruction given by operating the multiple apparatus display button 121 to be stored as a display setting in the ROM 22. Then, the process of the CPU 21 shifts to S169.

Figure 18B:
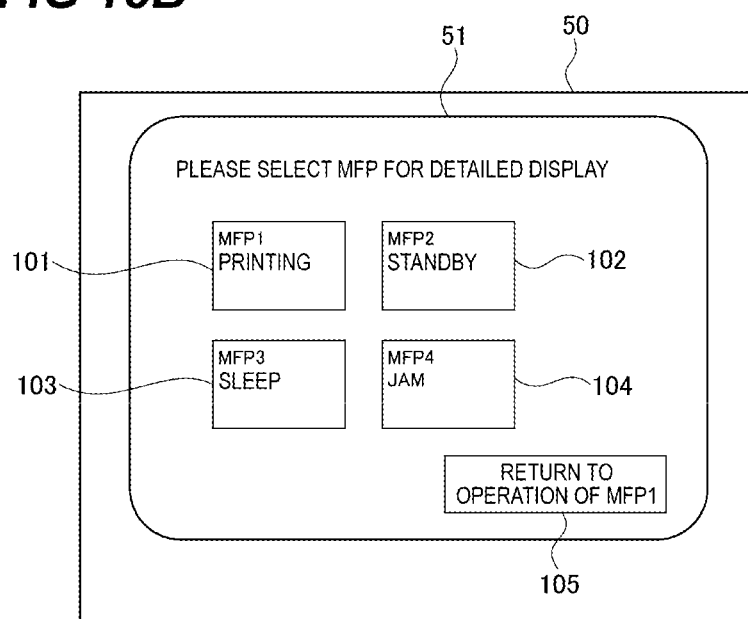

In S168, the CPU 21 causes the single apparatus detailed display mode corresponding to the instruction given by operating the single apparatus detailed display button 120 to be stored as a display setting in the ROM22. In this case, the CPU 21 transmits the statuses of the image forming apparatuses acquired in S164 to the image forming apparatus 1 currently to be operated. Then, the CPU 11 of the image forming apparatus 1 transmits image data illustrated in FIG. 18B from the image transmitting portion 83. The CPU 21 of the remote control panel 50 displays, on the display 51, a screen in which the statuses 101 to 104 of the four MFP1 to MFP4 and the button 105 for exiting the collective status display and returning to the operation of MFP1 are displayed, and prompts the user to select and input an image forming apparatus for which detailed display is to be performed. When the user selects MFP4 as the detailed display target from a screen illustrated in FIG. 18B, the CPU 21 causes information of the image forming apparatus in addition to the display setting of the single apparatus detailed display mode to be stored as a display setting in the ROM 22 of the remote control panel 50. Then, the process of the CPU 21 shifts to S169.

In S169, the CPU 21 acquires the statuses from the image forming apparatuses. In the present embodiment, the statuses are acquired from the image forming apparatuses 1, 142, 143, and 144. Then, the process of the CPU 21 shifts to S1610.

In S1610, the CPU 21 refers to the display setting stored in the ROM 22 and switches the screen displayed on the display 51 to the screen corresponding to the display setting. The CPU 21 refers to the display setting stored in the ROM 22 and transmits information indicating which display mode the CPU 21 is operating in to the command communication portion 82 of the image forming apparatus 1 via the command communication portion 92.

In this case, when the display setting is the multiple apparatus display mode, the CPU 11 of the image forming apparatus 1 transmits the image data illustrated in FIG. 10A to the remote control panel 50. Then, as illustrated in FIG. 10A, the CPU 21 of the remote control panel 50 collectively displays the statuses 101 to 104 of the four MFP1 to MFP4.

On the other hand, when the display setting is the single apparatus detailed display mode, the CPU 11 of the image forming apparatus 1 transmits the image data illustrated in FIG. 10B to the remote control panel 50. Then, the CPU 21 of the remote control panel 50 displays the detailed display of the one selected MFP1 in a large region as illustrated in FIG. 10B, and displays, side by side, the statuses 101 to 104 of the four MFPs in small tag-shaped regions next to the large region. Then, the process of the CPU 21 shifts to S1611.

In S1611, the CPU 21 shifts to its standby state. That is, the remote control panel 50 shifts to its standby state and waits for the next instruction of the user. After that, the process of the CPU 21 shifts to S153 in the flowchart illustrated in FIG. 9, and the series of additional processes illustrated in FIG. 17 is completed.

Other configurations and processes are the same as those described in the first embodiment, and the description thereof is omitted here.

As described above, according to the sixth embodiment, the user can select and save the display setting (display mode) for collectively displaying the statuses of the plurality of image forming apparatuses. Then, the collective status display screen corresponding to the stored display setting can be displayed on the display 51 by referring to the display setting stored when the remote control panel is activated. Since the display is set in advance, the statuses are collectively displayed first without any user operation, so that the user can grasp the statuses of the plurality of image forming apparatuses when the remote control panel is activated, and the convenience can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-007087, filed Jan. 20, 2021, which is hereby incorporated by reference herein in its entirety.

What is claimed is:

1. A method for controlling an image forming system including
a first image forming apparatus that has a first wireless communication unit configured to perform wireless communication and that is configured to form an image on a sheet based on image data,
a second image forming apparatus that has a second wireless communication unit configured to perform wireless communication and that is configured to form an image on a sheet based on image data, and
a wireless operation unit having a third wireless communication unit capable of wirelessly communicating with the first wireless communication unit and the second wireless communication unit, an acquiring unit configured to acquire, via wireless communication, status information, which is information on a status of the first image forming apparatus and a status of the second image forming apparatus, and a display configured to display the status information acquired by the acquiring unit, the method comprising:
a connection process in which the third wireless communication unit connects individually to each of the first wireless communication unit and the second wireless communication unit via wireless communication without a wireless LAN router;
a first acquisition process to acquire first status information regarding statuses of the first image forming apparatus and the second image forming apparatus;
a first display process to display the first status information regarding the statuses of the first image forming apparatus and the second image forming apparatus acquired in the first acquisition process;
a selecting process of receiving a selection of one image forming apparatus from among the first image forming apparatus and the second image forming apparatus;
a second acquisition process to acquire second status information which includes different information from the first status information and which pertains to the one image forming apparatus selected from among the first image forming apparatus and the second image forming apparatus; and
a second display process to display the second status information acquired by the second acquisition process.

2. The method for controlling the image forming system according to claim 1, wherein
the display can accept a touch operation by a user, and
the connection process is started in response to a touch on an acquisition icon displayed on the display.

3. The method for controlling the image forming system according to claim 1, wherein
the first status information includes a first number of items displayed at the first display process, and
the second status information includes a second number of items displayed at the second display process, the second number being larger than the first number.

4. The method for controlling the image forming system according to claim 1, wherein
the connection process includes
a first connection process in which the third wireless communication unit and the first wireless communication unit connect to each other via wireless communication,
a second connection process in which the third wireless communication unit and the second wireless communication unit connect to each other via wireless communication, and
in a state in which the third wireless communication unit and the first wireless communication unit are connected to each other via wireless communication in the first connection process, the first acquisition process is performed, and then the wireless communication connection between the third wireless communication unit and the first wireless communication unit is disconnected before the second connection process is started.

5. The method for controlling the image forming system according to claim 1, wherein the wireless communication between the third wireless communication unit and the first wireless communication unit in the connection process and the wireless communication between the third wireless communication unit and the second wireless communication unit in the connection process are Wi-Fi direct communication.

6. The method for controlling the image forming system according to claim 1, wherein the first status information is information indicating whether or not the first image forming apparatus is performing image formation based on an input job, and the second status information is information indicating whether or not the second image forming apparatus is performing image formation based on an input job.

7. The method for controlling the image forming system according to claim 1, wherein the first status information is information indicating the number of jobs accepted by the first image forming apparatus, and the second status information is information indicating the number of jobs accepted by the second image forming apparatus.

8. The method for controlling the image forming system according to claim 1, wherein the first status information is information regarding an optional device connected to the first image forming apparatus, and the second status information is information regarding an optional device connected to the second image forming apparatus.

9. The method for controlling the image forming system according to claim 1, wherein the first image forming apparatus and the second image forming apparatus form an image based on image data transmitted via a wireless LAN router.

10. An image forming system including,
a plurality of image forming apparatuses, each of the plurality of image forming apparatuses being configured to form an image on a sheet; and
a wireless operation unit wirelessly connectable to each of the plurality of image forming apparatuses,
wherein the wireless operation unit includes a display unit that accepts operations by a user and displays an image,
the display unit displays a first screen indicating each of the plurality of image forming apparatuses that can be wirelessly connected to the wireless operation unit, and
the first screen includes first status information, which is information regarding a status of each of the plurality of image forming apparatuses displayed on the first screen,
wherein at least one of the plurality of image forming apparatuses displayed on the first screen is selectable by the user, and
the display unit displays a second screen showing second status information including status information different from the first status information with respect to an image forming apparatus selected by the user from among the plurality of image forming apparatuses displayed on the first screen.

11. The image forming system according to claim 10, wherein the wireless operation unit transmits a request signal to at least one of the plurality of image forming apparatuses to request acquisition of the first status information, and the image forming apparatus receiving the request signal transmits the first status information to the wireless operation unit.

12. The image forming system according to claim 10, wherein each of the plurality of image forming apparatuses has a wireless communication unit that communicates wirelessly with the wireless operation unit and an image forming unit that forms images on sheets.

13. The image forming system according to claim 10, wherein each of the plurality of image forming apparatuses operates in a first power mode in which images can be formed on sheets, and a second power mode in which power consumption is lower than the first power mode.

14. The image forming system according to claim 13, wherein in the first power mode, power is supplied to the image forming unit and the wireless communication unit, in the second power mode, power is supplied to the wireless communication unit and not to the image forming unit.

15. The image forming system according to claim 10, wherein the plurality of image forming apparatuses and the wireless operation unit communicate with each other by Wi-Fi direct communication.

\* \* \* \* \*